US011470866B2

(12) United States Patent
Cheetham et al.

(10) Patent No.: US 11,470,866 B2
(45) Date of Patent: Oct. 18, 2022

(54) PROCESSING METHOD TO MAKE LOW OIL CONTENT NOODLES AND OTHER FOODS PRODUCED BY THE SAME

(71) Applicant: Toroz Pte. Ltd., Singapore (SG)

(72) Inventors: Peter Cheetham, Singapore (SG); Christoph Langwallner, Singapore (SG); Shiang Chuing Tey, Singapore (SG); Margit Langwallner, Singapore (SG); Wen Jue Amelia Tan, Singapore (SG)

(73) Assignee: Toroz Pte. Ltd., Singapore (SG)

( * ) Notice: Subject to any disclaimer, the term of this patent is extended or adjusted under 35 U.S.C. 154(b) by 546 days.

(21) Appl. No.: 15/771,943

(22) PCT Filed: Oct. 28, 2016

(86) PCT No.: PCT/SG2016/050532
§ 371 (c)(1),
(2) Date: Apr. 27, 2018

(87) PCT Pub. No.: WO2017/074267
PCT Pub. Date: May 4, 2017

(65) Prior Publication Data
US 2018/0338515 A1    Nov. 29, 2018

(30) Foreign Application Priority Data
Oct. 30, 2015   (SG) .............................. 10201508974T

(51) Int. Cl.
*A23L 7/113*   (2016.01)
*A23L 5/10*   (2016.01)
*A47J 37/06*   (2006.01)
*A23L 7/109*   (2016.01)
*A23L 27/10*   (2016.01)
*A23L 33/105*   (2016.01)

(52) U.S. Cl.
CPC ................ *A23L 7/113* (2016.08); *A23L 5/10* (2016.08); *A23L 5/13* (2016.08); *A23L 5/17* (2016.08); *A23L 7/109* (2016.08); *A23L 27/105* (2016.08); *A23L 33/105* (2016.08); *A47J 37/0641* (2013.01); *A23V 2002/00* (2013.01)

(58) Field of Classification Search
CPC ......... A47J 37/0641; A23L 7/113; A23L 5/10; A23L 27/105; A23L 33/105; A23L 5/13; A23L 5/17; A23L 7/109; A23L 5/12; A23V 2002/00
USPC ...................................................... 426/542
See application file for complete search history.

(56) References Cited

U.S. PATENT DOCUMENTS

| 5,124,168 A | * | 6/1992 | McMillin | A23L 7/111 |
| | | | | 426/451 |
| 5,500,236 A | * | 3/1996 | Miller | A23L 7/109 |
| | | | | 426/451 |
| 5,612,077 A | * | 3/1997 | Hibi | A23D 9/007 |
| | | | | 426/425 |
| 2005/0181109 A1 | | 8/2005 | Shiraishi et al. | |
| 2011/0229613 A1 | | 9/2011 | Takizawa et al. | |
| 2011/0318466 A1 | * | 12/2011 | Nagayama | A23L 7/113 |
| | | | | 426/557 |
| 2015/0037478 A1 | | 2/2015 | Asahina et al. | |

FOREIGN PATENT DOCUMENTS

| CN | 102461788 A | 5/2012 |
| JP | S62236455 A | 10/1987 |
| JP | S6349051 A | 3/1988 |
| JP | 2001321102 | 11/2001 |
| JP | 2006122020 | 5/2006 |
| WO | 2006066609 | 6/2006 |
| WO | 2007007366 A2 | 1/2007 |
| WO | 2010061412 A2 | 6/2010 |
| WO | 2014112565 A1 | 7/2014 |
| WO | 2015050430 A1 | 4/2015 |

OTHER PUBLICATIONS

NPL Pasta noodle (Retrieved on Nov. 30, 2020). (Year: 2020).*
Notification of Transmittal of the International Search Report and the Written Opinion of the International Searching Authority, or the Declaration for International Application No. PCT/SG2016/050532, "A Processing Method to Make Low Oil Content Noodles and Other Foods Produced by the Same", dated Dec. 5, 2016.
International Preliminary Report on Patentability for International Application No. PCT/SG2016/050532, "A Processing Method to Make Low Oil Content Noodles and Other Foods Produced by the Same", dated Jan. 15, 2018.
Supplementary European Search Report for EP Application No. EP 16 86 0401, "A Processing Method to Make Low Oil Content Noodles and Other Foods Produced by the Same", dated May 29, 2019.
English Translation of Office Action for JP Application No. 2018-542107, "A Processing Method to Make Low Oil Content Noodles and Other Foods Produced by the Same", dated Jun. 2, 2020.
Ohta, S., et al., "Antioxidants for Edible Fats and Oils" 1979, 28(10), pp. 747-759.

* cited by examiner

*Primary Examiner* — Donald R Spamer
*Assistant Examiner* — Bhaskar Mukhopadhyay
(74) *Attorney, Agent, or Firm* — Hamilton, Brook, Smith & Reynolds, P.C.

(57) ABSTRACT

A process for producing food having fried organoleptic properties with low oil content such as instant noodles with good aroma, taste, mouthfeel, colour and other characteristics by incorporating an antioxidant into the dough and cooking it in a stream of circulated air at a temperature of 100° C. or above.

15 Claims, 4 Drawing Sheets

PROCESSING METHOD TO MAKE LOW OIL CONTENT NOODLES AND OTHER FOODS PRODUCED BY THE SAME

RELATED APPLICATIONS

This application is the U.S. National Stage of International Application No. PCT/SG2016/050532, filed Oct. 28, 2016, which designates the U.S., published in English, and claims priority under 35 U.S.C. §§ 119 or 365(c) to Singapore Application No. 10201508974T, filed Oct. 30, 2015. The entire teachings of the above applications are incorporated herein by reference.

FIELD

The invention relates to methods of preparing food preferably noodles and the foods produced by the methods.

BACKGROUND

Instant noodles were invented in Japan in the late 1950s. Today there are about 104 billion portions sold annually, consisting of both air dried and deep fried noodles. The main types of instant noodles, are deep fried. Deep fried instant noodles contain 15% to over 25% oil, and make up 80% of all instant noodles consumed. Air dried noodles contain very little oil but lack any fried taste.

The consumption of instant noodles is growing in Asia, and is rapidly expanding into many countries in Africa, Europe and the Americas. Instant noodles are a cost effective, convenient and versatile meal that is set to grow to more than 145 billion portions annually by 2020 when it is estimated that with the market expanding at a CAGR of 6% people will eat more than 145 billion portions annually. This will mean that an additional 4 million metric tons of key raw materials will be needed and that the cost of these raw materials are likely to increase by 48%. In addition the high oil content of fried noodles is a concern because of the probable health consequences. Today 39% of adults are already classed as being overweight and 13% as obese, and with Type 2 diabetes (diabetes mellitus) increasing rapidly around the world.

Consequentially the challenge is to create healthier, yet tasty food alternatives without creating added pressure on raw material demands. Thus there is a very substantial unmet need for a way to substantially reduce the oil contents of fried noodles, together with the additional incentive of significantly reducing operating and capital costs of manufacture.

Commercially, companies are producing air-dried noodles that contain very little oil to create healthier alternatives for consumers. To illustrate the current state of noodle technology commercially available types of noodles were analysed and their oil contents either noted from statements on the packaging, or analysed by the Soxhlet method, air dried noodles had a final oil content of 0.08% to 0.58% depending on the brand. The air-dried noodles contain very little oil and are consequently healthier but lack any fried taste resulting in a lower market share. Therefore, due to poor consumer acceptance, fried noodles that contain a final oil content of about 16% to 28% still make-up 80% of all instant noodles consumed.

Deep fried foods account for a large portion of global caloric consumption. The process of deep frying requires a lot of oil, which in turn produces large amounts of waste oil that requires proper disposal. Where oil is reused several times it may break down and generate carcinogenic compounds such as acrylamide into the food being deep fried. In addition oils absorbed by food during deep frying, especially saturated fats and trans-fats have been linked to a higher risk of some cancers and many other health conditions.

Reductions in the oil contents of fried noodle are needed without compromising on the traditional taste, texture and appearance of instant noodles in order to create a healthier noodle with significant consumer acceptance. However, given the staple nature of noodles such healthier instant noodles should not be made at increased costs. This is a challenge when taking into account constraints including raw material supplies, the cost and scalability of the process, and safety and shelf-life requirements. Furthermore new more appetising low fat noodles need to be created so as to attract consumers to eat more healthily, and there is an unmet need to be able to improve the flexibility of manufacturing so that a greater variety of noodles can be made using the same equipment. For example, with current commercial industrial equipment separate lines are required for deep frying and air drying.

The object of the invention is to at least ameliorate one or more of the above mentioned problems.

SUMMARY OF INVENTION

The abovementioned need is met at least in part and an improvement in the art is made by a simplified noodle processing method and noodles and other foods produced by the same in accordance with this invention.

Accordingly, an aspect of the present invention relates to a process for producing food with enhanced fried oil flavour comprising: (a) preparing a dough comprising an antioxidant, flour, oil in the range of 0.06% to 15% with respect to the weight of the flour; and a water-based liquid; (b) shaping the dough; (c) placing the shaped dough in a chamber (d) gelatinising the flour and cooking the dough at a combined temperature-time measurement of about 300 to 2100 units, wherein at least one stage of the cooking comprises circulating a stream of air at a temperature of 100° C. or above and a speed of 1 metres per second or above; wherein the oil is incorporated into the dough without any external application of oil to the shaped dough prior to gelatinizing and cooking.

Another aspect of the invention comprises instant noodles with enhanced fried oil flavour obtained by the process comprising an antioxidant and a final oil content substantially in the range of 0.06% to 15%.

Another aspect of the invention comprises an antioxidant blend for use in a dough-based product including noodles with enhanced fried oil flavour comprising an antioxidant; combinable with a flour and a water-based liquid to make a dough comprising oil in the range of 0.06% to 15% with respect to the weight of the flour; and instructions for making the dough.

Another aspect of the invention comprises a method of making noodles with a health benefit comprising: (a) preparing a dough comprising an antioxidant, flour, oil in the range of 0.06% to 15% with respect to the weight of the flour; and a water-based liquid; (b) shaping the dough; (c) placing the shaped dough in a chamber (d) gelatinising the flour and cooking the dough at a combined temperature-time measurement of about 300-2100 units, wherein at least one stage of the cooking comprises circulating a stream of air at a temperature of 100° C. or above and a speed of 1 metres per second or above; wherein the oil is incorporated into the dough without any external application of oil to the shaped dough prior to gelatinizing and cooking.

Another aspect of the invention comprises a dough for making food products with enhanced fried oil flavour comprising flour, an oil in the range of 0.06% to 15% with respect to the weight of the flour; and a water based liquid wherein the dough contains an antioxidant and the oil is incorporated into the dough.

Another aspect of the invention comprises a dough for making noodles with enhanced fried oil flavour comprising flour, an oil in the range of 0.06% to 15% with respect to the weight of the flour; and a water based liquid wherein the dough contains an antioxidant and the oil is incorporated into the dough.

Another aspect of the invention comprises noodles with enhanced fried oil flavour comprising an antioxidant and a final oil content substantially in the range of 0.06% to 15%.

Other aspects of the invention will become apparent to those of ordinary skill in the art upon review of the following description of specific embodiments of the invention in conjunction with the accompanying figures.

BRIEF DESCRIPTION OF THE DRAWINGS

Various embodiments of the invention will now be described, by way of example only, with reference to the accompanying drawings, in which.

DETAILED DESCRIPTION

Figure 1:
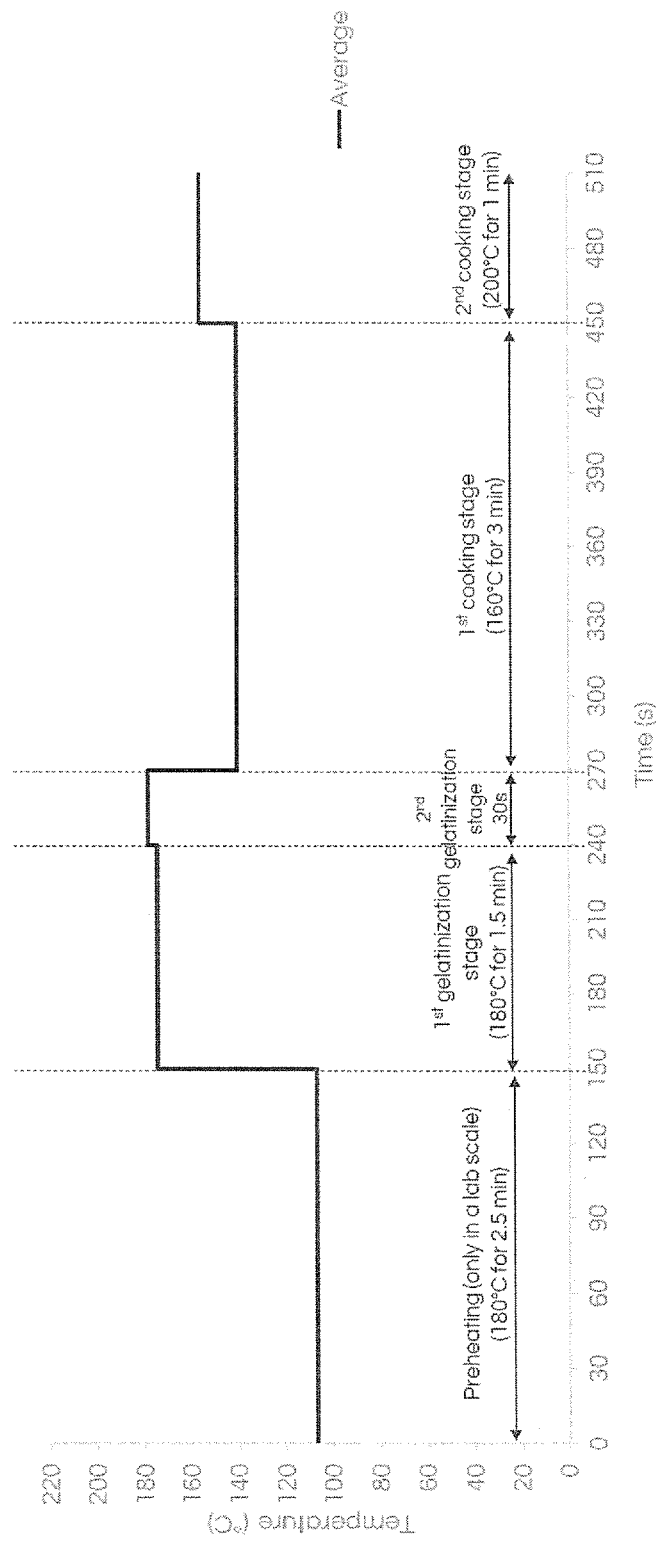
FIG. 1. An example of the temperature profile of the processing method to make low oil content noodles.

Unless defined otherwise, all technical and scientific terms used herein have the same meaning as is commonly understood by a skilled person to which the subject matter herein belongs.

An aspect of the invention relates to a process for producing food with enhanced fried oil flavour comprising: (a) preparing a dough comprising an antioxidant, flour, oil in the range of 0.06% to 15% with respect to the weight of the flour; and a water-based liquid; (b) shaping the dough; (c) placing the shaped dough in a chamber (d) gelatinising the flour and cooking the dough at a combined temperature-time measurement of about 300 to 2100 units, wherein at least one stage of the cooking comprises circulating a stream of air at a temperature of 100° C. or above and a speed of 1 metres per second or above; wherein the oil is incorporated into the dough without any external application of oil to the shaped dough prior to gelatinizing and cooking.

As used herein the term enhanced fried oil flavour refers to an edible food with low oil content and fried organoleptic properties. In various embodiments the food comprises noodles. In various embodiments the food comprises instant noodles. In various embodiments the instant noodles are air-fried noodles. In various other embodiments the instant noodles are air-dried noodles. In various embodiments the noodles have a good combination of fried-oily aroma, flavour and taste, mouthfeel characteristics such as first-bite and chewiness, colour, and other characteristics such as moisture content and rehydration properties. The addition of an antioxidant results in an enhanced fried oil flavour. As used in the specification, the term "Fried Oil Taste/Flavour/Aroma" refers to combinations of fried, roasted, fatty, oily and other tastes and aromas generated by the heating (via standard cooking or other known food processing techniques) of oils or fats, or foods containing oils or fats, or foods to which oils or fats have been added, or generated by the methods disclosed herein. As can be imagined, the addition of an antioxidant to a dough wherein the dough is deep fried may similarly results in an enhanced fried oil flavour. However this is not subject of this application.

In various embodiments the food comprises pasta. In various embodiments the food comprises baked or fried dough-based confections such as doughnuts and vadai. In various embodiments the food comprises dough-based dim sum items which may be further steamed, fried or deep-fried, such as gyoza, and xiao long bao.

As used herein the term antioxidant refers to a molecule that inhibits the oxidation of other molecules. In various embodiments the antioxidant is plant-derived. In various embodiments the antioxidant is oil-soluble or lipophilic. Two main types of antioxidants may be used, either alone or in combination, all of which contain one or more antioxidants that have now been found to accelerate the formation of fried oil flavours in noodles and other foods, and that also have various proven health benefits and so provide additional health benefits to the low oil health benefits of the low oil content fried noodles, such as the pro-vitamin A activity of beta-carotene.

In various embodiments the antioxidant is selected from alpha-carotene, beta-carotene, lycopene, lutein, alpha-tocopherol, gamma-tocopherol, tocotrienols, retinol, coenzyme Q10, alliin, allicin, diallyl disulfide, quercetin, protocatechuic acid, lignans, molecules obtained from *Allium* species or any combination thereof.

In various embodiments the antioxidant comprises beta carotene. In various embodiments the beta carotene may be a purified beta carotene. In various embodiments the beta carotene may be an isolated form of beta carotene available commercially or it may be present from macerated plant material such as crude palm oil, gac fruit or carrots.

In various embodiments the antioxidant comprises lycopene. In various embodiments the lycopene may be a purified lycopene. In various embodiments the lycopene may be an isolated form of lycopene available commercially or it may be present from macerated plant material such as crude palm oil, tomatoes or carrots.

The IUPAC name for lycopene is (6E,8E,10E,12E,14E, 16E,18E,20E,22E,24E,26E)-2,6,10,14,19,23,27,31-Octamethyldotriaconta-2,6,8,10,12,14,16,18,20,22,24,26,30-tridecaene).

In various embodiments the antioxidant comprises lutein. In various embodiments the lutein may be a purified lutein. In various embodiments the lutein may be an isolated form of lutein available commercially or it may be present from macerated plant material such as crude palm oil, tomatoes or carrots. The IUPAC name of lutein is β,ε-carotene-3,3'-diol.

In various embodiments the antioxidant is alpha-tocopherol. In various embodiments the alpha tocopherol may be a purified alpha tocopherol. In various embodiments the alpha tocopherol may be an isolated form of alpha tocopherol available commercially, isolated from oil seeds or it may be present in oils high in alpha-tocopherol such as in crude palm oil. The IUPAC name for alpha-tocopherol is (2R)-2,5,7,8-Tetramethyl-2-[(4R,8R)-(4,8,12-trimethyltridecyl)]-6-chromanol).

In various embodiments the antioxidant is retinol. In various embodiments the retinol may be a purified retinol. In various embodiments the retinol may be an isolated form of retinol available commercially.

In various embodiments the antioxidant is alliin. In various embodiments the alliin may be a purified alliin. In various embodiments the alliin may be an isolated form of alliin available commercially or it may be present from macerated vegetables such as garlic or onion or any other plant material from a species of the *Allium* genus. The IUPAC name for alliin is (2R)-2-amino-3-[(S)-prop-2-enylsulfinyl] propanoic acid.

In various embodiments the antioxidant is quercetin. In various embodiments the quercetin may be a purified quercetin. In various embodiments the quercetin may be an isolated form of quercetin available commercially or it may be present from macerated vegetables such as garlic or onion or any other plant material from a species of the *Allium* genus. The IUPAC name for quercetin is 2-(3,4-dihydroxyphenyl)-3,5,7-trihydroxy-4H-chromen-4-one).

In various embodiments the antioxidant is comprised in macerated garlic. In various embodiments the antioxidant is comprised in macerated onion. Various macerates or extracts of *allium* plant species, especially of garlic and onion, and or the antioxidant molecules they contain, such as alliin and allicin (IUPAC name: S-Prop-2-en-1-yl prop-2-ene-1-sulfinothioate), and quercetin, that are present in garlic and onion respectively, and that have now been found to accelerate the formation of fried oil flavours especially in noodles. In various embodiments the macerated garlic or onion is freshly cut and un-fried. In various embodiments the macerated garlic or onion is dry-fried. In various embodiments the macerated garlic or onion is fried in endogenous oil. In various embodiments the macerated garlic or onion is fried in exogenous oil.

In various other embodiments the antioxidant has both the advantage of accelerating the formation a fried oil flavour in noodles and provides the added health benefits. In various embodiments the antioxidant is present in some vegetable oils such as unrefined palm oil/crude palm oils. The antioxidant molecules present, such as beta-carotene, lycopene, lutein and alpha-tocopherol have all been found herein to accelerate the formation of fried-oil flavours even in the absence of any oil added to the noodles. In addition, some oils such sesame seed oil also have other flavours that contribute to the fried-oily flavour of the noodles.

Non-limiting examples of antioxidants include; vitamins A and E such as retinol, phenolic antioxidants in particular tocotrienols or tocopherols, alpha-tocopherol, carotenoid antioxidants, in particular beta-carotene, alpha-carotene, lycopene, lutein, or coenzyme Q10; alliin, and its metabolites allicin, diallyl disulphide (IUPAC name: 3-[(Prop-2-en-1-yl) disulfanyl] prop-1-ene) and/or others that are present in garlic extracts, quercetin or protocatechuic acid (IUPAC: 3,4-Dihydroxybenzoic acid) that are present in onion extracts, and lignans, such as sesamol. Similarly food grade antioxidants such as Butylated hydroxyanisole (BHA—E320), Butylated hydroxytoluene (BHT—E321), Tertiary-butyl hydroquinone (TBHQ—E319) or gallates or any other synthetic or natural food grade antioxidant known in the art should also be suitable. The presence of the oil-soluble antioxidant aids the development of fried organoleptic properties in any food product made by the dough even with a very low oil content when it is cooked in a stream of circulated air at a temperature of 100° C. or above by accelerating the formation of the fried oil flavour.

A terpenoid refers to a hydrocarbon formed of several isoprene units that have been modified by either removing methyl groups, adding oxygen atoms or both. In various embodiments the terpenoids comprise at least four isoprene units or any terpenoids comprising isoprene units in the range of at least four to eight units or any terpenoids comprising isoprene units in the range of at least six to eight units. In various embodiments the terpenoid is selected from a group consisting of a diterpenoid, a triterpenoid or a tetraterpenoid having 4, 6 or 8 isoprene units respectively. In various embodiments the terpenoid is selected from a triterpenoid or a tetraterpenoid having 6 or 8 isoprene units' respectively. The diterpenoids may include retinol. The triterpenoids may include steroids such as oleanolic acid or beta sitosterol both commonly found in all *Allium* species such as garlic, onion, chives, leeks, shallots. In various embodiments the triterpenoid covers triterpenoid derivatives such as tocotrienols and tocopherols. The tetraterpenoids may include carotenoids such as alpha carotene; beta carotene; gamma carotene, lycopene, lutein, neurosporene, phytofluene, phytoene or coenzyme Q10. The amount and bioavailability of carotenoids is known to be enhanced by thermal and mechanical processing. The tetraterpenoids may also include xanthophylls such as canthaxanthin, zeaxanthin, or lutein. In various embodiments the terpenoid is selected from alpha carotene; beta carotene; lycopene; lutein; tocopherol; tocotrienol; coenzyme Q10; oleanolic acid; or beta sitosterol.

In various embodiments at least two antioxidants are used. Many crude edible oils contain several antioxidants. By way of example only, crude palm oil is known to contain combinations of antioxidants including alpha and beta carotenes, lycopene, lutein, tocopherols and tocotrienols, and coenzyme Q10. Other Examples include sesame oil that is known to contain campesterol, stigma sterol, beta sitosterol and tocopherol; peanut oil is known to contain beta sitosterol and tocopherol; Rice bran oil that is known to contain campesterol, stigma sterol, beta sitosterol, tocotrienol and tocopherol. Vegetables are another source of antioxidant whereby the vegetables contain at least two different antioxidants. By way of Example only, carrots are known to contain alpha and beta carotenes, and lycopene and lutein. Other examples include species in the *Allium* genus that are known to contain oleanolic acid, beta sitosterol, alliin, allicin, diallyl disulphide, other metabolites of alliin, quercetin, protocatechuic acid, and other metabolites of quercetin, and lignans such as sesamol, which are present in sesame seed oil.

In various embodiments the antioxidant is added to the oil. While antioxidants are naturally present in crude edible oil the processes for refining edible oil often removes some or most of the natural antioxidants present in oil. Hence, in various embodiments where refined oil is used in the dough it may be necessary to add antioxidants to obtain an oil that contains an antioxidant at a sufficient amount. If a combination of antioxidant and oil is used, the antioxidant is to first be mixed into the oil so that the oil contains the antioxidant prior to incorporating the oil into the flour or dough. The interaction of the antioxidant and the oil allows the development of fried organoleptic properties in any food product made by the dough with a very low oil content when it is cooked in a stream of circulated air at a temperature of 100° C. or above. The oil must contain an antioxidant for this interaction to occur when small amounts of oil are used. In various embodiments the antioxidant is a purified antioxidant.

In various embodiments the amount of purified antioxidant added is in the range of 0.0005% to 2% refers to the percentage of antioxidant added to an edible oil in weight percent to the flour weight of the dough. In various embodiments the percentage of antioxidant added to the oil in a weight percentage is about 0.0005% to 1.5% or about 0.0005% to 0.5%, or about 0.005% to 0.05% or about 0.00055% to 0.00135%. In various embodiments wherein the antioxidant is in oil or as macerated plant material, the amount of oil or material added is in the range of 0.06% to 15%.

In various embodiments the added antioxidant is present in the form of macerated plant material. Plant materials, such as vegetables, often have significant amounts of antioxidants. Any macerated plant material that contain oil soluble antioxidants may be used to add to the oil prior to incorporation into the dough. In various embodiments, macerated plant material containing antioxidants is added directly to the dough. Examples of plant material may include, carrots; species of the *Allium* genus such as garlic, onion, chives, leeks, or shallots; sweet potato; pumpkin; paprika; red pepper; tomato; spinach; kale; avocado; beans or any other vegetables that include antioxidants. In various embodiments the macerated plant material comprises macerated garlic. In various embodiments the macerated plant material comprises macerated onion. In various embodiments the macerated plant material comprises macerated carrot. In various embodiments the macerated plant material are fried in the oil prior to the resulting oil being incorporated into the dough.

In various embodiments the antioxidant comprises allicin, diallyl disulphide, quercetin or protocatechuic acid. In various embodiments the antioxidant may be an isolated form of garlic or onion extracts available commercially or in may be present from macerated plant material such as species from the *Allium* genus including garlic, onion, chives, leeks, shallots or other vegetables in the *Allium* genus.

In various embodiments the method for producing food with low oil content comprising: (a) preparing a dough including flour, 0.25% to 15% oil and a water based liquid; (b) shaping the dough; (c) placing the shaped dough in a chamber; and (d) cooking the shaped dough without any steaming step in the chamber in a stream of circulated air wherein the stream of circulating air is 100° C. or above and the speed of the stream is 10 metres per second or above.

In various embodiments the food is instant noodles. In various embodiments the instant noodles are fried noodles. In various other embodiments the instant noodles are air-dried noodles.

In various embodiments the food is pasta.

In various embodiments the food is baked or fried dough-based confections such as doughnuts.

In various embodiments the food is dough-based dim sum items which may be further steamed, fried or deep-fried, such as gyoza, and xiao long bao.

As used herein the term "flour" refers to a powder made by grinding uncooked cereal grains, seeds or roots. Examples include wheat flour, durum wheat flour, semolina flour, rice flour, corn flour, cassava flour, potato flour, rye flour, gluten-containing flour and others known to those in the art. In various embodiments the flour may further comprise added exogenous starch. Examples include tapioca starch, potato starch, corn starch, or any other starch known in the art.

In various embodiments the flour comprises wheat flour. In various embodiments the flour comprises durum wheat flour. In various embodiments the flour comprises semolina flour. In various embodiments the flour comprises a combination of flours with at least one of the combinations of flour being a gluten-containing flour. In various embodiments the flour has gluten added.

As used herein the term oil refers to endogenous oil naturally present in flour or an added exogenous oil such as liquid plant derived oil such as vegetable oil, preferably a triglyceride based oil.

In various embodiments the antioxidant is added without any further addition of oil. In such cases the oil in the noodles comes from the endogenous oil content in the flour. In various embodiments the oil in the dough consists of endogenous oil wherein the oil consists of the endogenous oil content in the flour. Flour contains only the very small amounts of oil, much less than 1%, that are naturally present in the original flour. Most flours contain a small quantity of endogenous oil which we have assessed for wheat flours as being from 0.06 to 0.24%.

The process that involves mixing all the oil required into the noodle dough before sheeting and cutting of the dough to make uncooked noodles; and with the option of including absolutely no added oil at all wherein the oil in the dough comes from the endogenous oil in the flour. The dough may then be processed with or without any traditional preliminary steaming operation, by heating in a circulated High Velocity stream of high temperature air while varying the humidity of that air until the noodles have developed an acceptable fried-oily flavour and good mouthfeel and other characteristics. Such a process where there is no external addition of oil or placing the noodles in a vat of oil for deep frying greatly reduces the cost as less oil is required and significantly reduces any chance of unhealthy trans-fats being present in the noodles or other foods because there is no need to reuse the frying oil.

In various embodiments the oil comprises oil added at a concentration of 0.001% to 14.94%. Together with the endogenous oil already present in the flour the resulting dough has about 0.06% to 15% oil.

In various embodiments the oil is a vegetable oil. In various embodiments the oil is a triglyceride based oil. In various embodiments the oil is a liquid or semi-liquid oil.

In various embodiments the oil is selected from sunflower oil, sesame seed oil, flaxseed oil, olive oil, oils extracted from roasted oil seeds such as sunflower, sesame and flaxseed, fractions of palm oil, palmolein, crude palm oil, refined bleached deodorized palm oil, onion-infused oil, garlic-infused oil, fried garlic oil, fried onion oil, pre-fried oil, or any combination thereof. In various embodiments the fried garlic oil or fried onion oil comprises endogenous oil extracted from garlic or onion and fried. In various embodiments the fried garlic oil or fried onion oil comprises garlic or onion fried with non-endogenous oils such as palmolein or any other oil mentioned herein. In various embodiments the flaxseed oil comprises omega-3 fatty acids, alpha-linoleic acid, docosahexaenoic acid, eicosapentaenoic acid, gamma-tocopherol, and tocotrienols.

As used herein the term 'oil in the range' refers to the percentage of an edible oil in the dough on a weight percent to the flour weight. The percentage of oil present in the dough may be there endogenously from the oil naturally present in the flour or the oil may be added to the dough. In various embodiments the oil is in the range of 0.06% to 15% with respect to the weight of the flour. In various embodiments the oil is in the range of or is added in a weight percentage of 0.06% to 0.25%, or 0.06% to 0.24%, or 0.1% to 15%, or 0.25% to 15%, 0.25% to 10%, 0.25% to 7%, or 0.5% to 15%, 0.5% to 10%, 0.5% to 7%, 0.75% to 15%, 0.75% to 10%, 0.75% to 7%, or 1% to 15%, or 1% to 10%, or 1% to 7%, or 2% to 15%, or 2% to 10%, or 2% to 7%, or 2.5% to 15%, or 2.5% to 10%, or 2.5% to 7%, or 3.5% to 15%, or 3.5% to 10%, or 3.5% to 7%, or 5% to 15%, or 5% to 10%, or 5% to 7%, or 6% to 15%, or 6% to 10%, or 6% to 7%. In various embodiments the oil % w/w is measured by the Soxhlet method.

In various embodiments the oil comprises refined edible oil. Examples of refined edible oil include olive oil, palm oil, soybean oil, canola oil, corn oil, peanut oil, cotton seed oil, avocado oil, rice bran oil, safflower oil, sunflower oil sunflower seed oil, flaxseed oil, sesame oil, roasted sesame oil, sesame seed oil or any other vegetable oil including nut oils known in the art.

In various embodiments the oil comprises crude edible oil. Examples of crude edible oil include, Extra Virgin olive oil, Crude palm oil, coconut oil or any other cold pressed oils or hot-pressed oils known in the art.

In various embodiments the oil used may be fresh oil that has not been used for any other purposes such as cooking. In various other embodiments the oil used may be oil that has been re-fried, or oil that has been used for other food applications, or recycled oil, or other used edible oils known in the art.

In various embodiments the oil comprises a combination of any of the abovementioned oils.

In various embodiments the oil comprises flavoured oil including any of the oils listed above with a small amount of highly flavored oil added in the amount of about 0.5% to 1%. Examples of highly flavoured oil include chilli oil, garlic oil, pre-fried oil, sesame oil, mustard oil. In various other embodiments the oil comprises flavoured oil including any of the oils listed above with a small amount of flavor such as garlic, cheese, or other flavours known in the art. In various embodiments the antioxidant may come from the flavouring in the oil. In various embodiments the flavoured oil includes roasted seed oils that contribute to the fried oil flavour of the noodles such as roasted sesame seed oil or roasted sunflower seed oil In various embodiments the water based liquid is selected from water, kansui solution, alkaline water, drinking water, water or any other water based liquid known in the art for making dough or noodle dough.

In various embodiments the water based liquid comprises a combination of the abovementioned liquids.

As used herein the term gelatinizing refers to the process of breaking down intermolecular bonds between polysaccharides in the starch found in dough by water and heat. In various embodiments the water and heat is in the form of increased humidity from warmed water vapour in the air used for gelatinization. In various embodiments a starch in the flour is gelatinised in a humid environment at a temperature of 55° C. or above. The temperature will depend on the source of the starch for example some starched gelatinize at about 55° C. while others requires higher temperatures of about 165° C. In various embodiments gelatinizing includes steaming with a steamer, steaming via in-situ steam within the same chamber as the cooking stage, steaming with superheated steam, steaming with humid air.

In various embodiments the gelatinising occurs in two stages carried out in a humid environment; a first gelatinising stage comprises circulating humid air at a speed of 1 metre per second or above and a second gelatinising stage comprises static humid air wherein the humid air is not circulated. In various embodiments the humid environment may be formed by pumping steam into the chamber or it may be provided by including water within the chamber. In various embodiments the air speed for the first gelatinising stage is between 1 metres per second and 5 metres per second. In various embodiments the air speed is between 1 metres per second and 10 metres per second. In various embodiments the air speed for the first gelatinising stage is between 10 metres per second and 50 metres per second. In various embodiments the air speed for the first gelatinising stage is between 10 metres per second and 60 metres per second. In various embodiments the air speed for the first gelatinising stage is between 10 metres per second and 70 metres per second. In various embodiments the air speed for the first gelatinising stage is between 10 metres per second and 80 metres per second. In various embodiments the air speed for the first gelatinising stage is between 10 metres per second and 90 metres per second. In various embodiments the air speed for the first gelatinising stage is between 10 metres per second and 100 metres per second. In various embodiments the air speed for the first gelatinising stage is between 17 metres per second and 49 metres per second. In various embodiments the air speed for the first gelatinising stage is between 32 metres per second and 48 metres per second. In various embodiments the air speed for the first gelatinising stage is 48 metres per second.

In various embodiments the at least one stage of the cooking circulates a stream of air at the temperature of 100° C. or above and a speed of 10 metres per second or above.

In various embodiments the cooking occurs in two stages carried out in an environment where the humidity is lower than the humid environment of the gelatinization stages; a first cooking stage comprises dehydrating the noodles and a second cooking stage comprises a development of colour, good eating quality and fried oil flavour, wherein the temperature in the second cooking stage is higher than the temperature in the first cooking stage.

In various embodiments the first and second cooking stages comprises circulating air at a speed of 10 metres per second or above. Such an embodiment may be referred to as the first and second cooking stages comprises circulating air at a high velocity and high temperature. In various embodiments the air speed for the first and second cooking stages is between 10 metres per second and 50 metres per second. In various embodiments the air speed for the first and second cooking stages is between 10 metres per second and 60 metres per second. In various embodiments the air speed for the first and second cooking stages is between 10 metres per second and 70 metres per second. In various embodiments the air speed for the first and second cooking stages is between 10 metres per second and 80 metres per second. In various embodiments the air speed for the first and second cooking stages is between 10 metres per second and 90 metres per second. In various embodiments the air speed for the first and second cooking stages is between 10 metres per second and 100 metres per second. In various embodiments the air speed for the first and second cooking stages is between 17 metres per second and 49 metres per second. In various embodiments the air speed for the first and second cooking stages is between 32 metres per second and 48 metres per second. In various embodiments the air speed for the first and second cooking stages is 48 metres per second.

In various embodiments the chamber comprises internal surfaces to optimise air circulation within the chamber. In such examples all stages of gelatinising and cooking occur in a single chamber that preferably has curved surfaces to encourage the flow and circulation of air. Any similar shape that encourages the flow and circulation of air within the chamber would also be suitable. The ability to perform all the gelatinizing and cooking within one chamber provides significant cost saving.

In various embodiments the process further comprising additional flavouring materials including flavours, aroma chemicals and taste enhancers. In various embodiments the process further comprises adding flavouring materials including flavours, aroma chemicals, and taste enhancers.

In various embodiments the method further comprises adding improvers which improve the quality of the dough either in terms of mouthfeel, final oil-fried taste, or water-binding capacity.

In various embodiments, the improvers added to the dough may be protein-based such as gluten, enzyme-based such as transglutaminase, peroxidase, lipoxygenase, emulsifier-based such as lecithin, hydrocolloid-based such as guar, xanthan, kappa-carrageenan or sugar-based such as trehalose.

As described herein the term shaping the dough refers to any method known in the art for shaping dough and may include traditional methods such as rolling, cutting, or hand shaping or the dough may be shaped with a machine that result in flattened sheets and/or noodle or pasta shapes or doughnut shapes.

In various embodiments the stream of circulated air is circulated at a speed of 1 meters per second or above. In various embodiments the stream of circulated air is circulated at high velocity. In various embodiments the stream of circulated air varies for the different gelatinizing and cooking stages. In various embodiments high velocity refers to the stream of circulated air being circulated at a speed of 10 meters per second or above. The shaped dough is placed in a chamber. Preferably, the chamber is enclosed to a certain degree to allow a fluid to be circulated therethrough at a speed of 1 metres per second or above. In various embodiments the fluid is a gas preferably, air or humidified air. In various embodiments the air speed is between 1 metres per second and 5 metres per second. In various embodiments the air speed is between 1 metres per second and 10 metres per second. In various embodiments the air speed is between 10 metres per second and 50 metres per second. In various embodiments the air speed is between 10 metres per second and 60 metres per second. In various embodiments the air speed is between 10 metres per second and 70 metres per second. In various embodiments the air speed is between 10 metres per second and 80 metres per second. In various embodiments the air speed is between 10 metres per second and 90 metres per second. In various embodiments the air speed is between 10 metres per second and 100 metres per second. In various embodiments the air speed is between 17 metres per second and 49 metres per second. In various embodiments the air speed is between 32 metres per second and 48 metres per second. In various embodiments the air speed is 48 metres per second.

In various embodiments the stream of circulated air is circulated using equipment that circulates air at or above 100° C. around and through the uncooked noodle cakes in a continuous process in which streams of hot air are directed at noodles containing oil evenly dispersed within the dough, with heat transfer optionally increased by shaped internal surfaces of the equipment, and with the first stage of the frying carried out in a humid environment such as created by the generation of steam inside the first stage of the equipment, or by the introduction of steam into the first stage of the equipment, and with the facility to vary the operating temperature and the humidity of the equipment as the noodles move through the equipment so as to at least partially gelatinise, and then internally fry the noodles quickly and evenly at a higher temperature developing colour, good eating quality and a fried oil flavour. In various embodiments the process may be conducted in a tunnel oven type design. In various other embodiments the process may be conducted in air-frying equipment. In various embodiments the process may be conducted in a conventional air-drying equipment. In various other embodiments, the process may be conducted with convection heating, vertical impingement, horizontal air impingement, or any other heating known in the art.

In various embodiments the stream of circulating air is 55° C. or above. In various embodiments the stream of circulating air is 100° C. or above. In various embodiments the stream of circulating air is 100° C. to 220° C., 100° C. to 210° C., 100° C. to 200° C. 100° C. to 190° C., or 110° C. to 190° C., or 120° C. to 190° C., or 130° C. to 190° C., or 140° C. to 190° C., or 150° C. to 190° C., or 160° C. to 190° C., or 170° C. to 190° C., or 180° C. to 190° C., or 100° C. to 180° C., or 100° C. to 170° C., or 100° C. to 160° C., or 100° C. to 150° C., or 100° C. to 140° C., or 110° C. to 180° C., 110° C. to 170° C., 110° C. to 160° C., 110° C. to 150° C., 110° C. to 140° C., or 120° C. to 180° C., or 120° C. to 170° C., or 120° C. to 160° C., or 120° C. to 150° C., or 120° C. to 140° C., or 130° C. to 180° C., or 130° C. to 170° C., or 130° C. to 160° C., or 130° C. to 150° C., or 130° C. to 140° C., or 150° C. to 180° C., or 150° C. to 170° C., or 150° C. to 160° C., or 140° C. to 150° C. In various embodiments the heating process uses different temperatures in a step wise manner within the same chamber. By way of example only, the noodles may be heated in a first gelatinizing stage to 175° C. for 1.5 minutes at a circulated air speed of about 48 metres per second with water present; the air circulation is stopped and the second gelatinizing stage at temperature of about 178° C. for 0.5 minutes with water present, then in the first cooking stage the chamber is heated to about 140° C. for 3 minutes at a circulated air speed of about 48 metres per second without any water present and in the first cooking stage the chamber is heated to 156° C. for 1 minute. There are many different permutations that can be used for cooking and the best way to determine the temporal temperature used for cooking is to calculate the area under the curve for a given cooking process. The area under the curve is calculated as accumulated temperature by time as exemplified in FIG. 1 where the area under the curve value is (1.5×175)+(0.5×178)+(3× 140)+(1×156)=927.5 units. In various embodiments the combined temperature-time measurement of about 300 to 2100 units, may be used to achieve the desired noodles. In various embodiments the combined temperature-time measurement used for cooking the food items such as noodles is from 300 to 2000, or 500 to 1500 or 500 to 1000, 500 to 2100, or 550 to 2000 or 600 to 2000, or 700 to 1000, or 800 to 1000, or 900 to 1000, or 900 to 2000, or 600 to 900.

In various embodiments the first gelatinising stage is from 55° C. to 160° C. for 0.5 minutes to 2 minutes; the second gelatinising stage is from 90° C. to 165° C. for 0.5 minutes to 1 minute; the first cooking stage is from 80° C. to 160° C. for 1 minute to 6 minute; and the second cooking stage is from 110° C. to 190° C. for 1 to 4 minutes.

Another aspect of the invention comprises instant noodles with enhanced fried oil flavour obtained by the method disclosed herein comprising an antioxidant and a final oil content substantially in the range of 0.06% to 15%.

The process produces instant/fried noodles with enhanced fried oil flavour, reduced oil content and an antioxidant so enhancing their healthiness and reducing their costs without compromising on taste. The noodles only contain 0.06% to 15% oil, as compared to currently available fried instant noodles made by deep-frying, that typically contain between 18% to 25% oil. Therefore due to their low oil contents requiring the addition of only low levels of oil of 0% to 14.94%, the resulting newly developed noodles have health benefits and cost saving advantages as compared to current instant fried noodles.

As used herein like terms have the same meaning as used to describe other aspects or embodiments of the invention.

Instant noodles as used herein refers to noodles refer to dried or dehydrated noodles that require rehydration prior to consumption.

In various embodiments the instant noodles comprise a final oil content of substantially between 0.7% and 11%.

In various embodiments the final oil content may comprise about 0.06% to 15%, 0.7% to 11%, 0.7% to 10%, 0.7% to 9%, 0.7% to 8%, 0.7% to 7%, 0.7% to 15% or 1% to 11%, 1% to 10%, 1% to 9%, 1% to 8%, 1% to 7%, 1% to 15% or 2% to 11%, 2% to 10%, 2% to 9%, 2% to 8%, 2% to 7%, 2% to 15% or 3% to 11%, 3% to 10%, or 3% to 9%, 3% to 8%, 3% to 7%, 3% to 15%, or 4% to 11%, or 4% to 10%, or 4% to 9%, 4% to 8%, 4% to 7%, 4% to 15%, or 5% to 11% or 5% to 10%, 5% to 9%, 5% to 8%, 5% to 7%, 5% to 15%, or 6% to 11%, 6% to 10%, or 6% to 9%, or 6% to 8% or 6% to 7% 6% to 15%, or 7% to 15%, or 8% to 15%, or 9% to 15%, or 10% to 15%, or 11% to 15%, or 12% to 15%. In various embodiments the oil % w/w as measured by the Soxhlet method.

In various embodiments the instant noodles are obtained by the method using crude oil wherein the instant noodles comprise a natural yellow colour from the crude oil. In various embodiments the instant noodles comprise a natural yellow colour derived from an antioxidant.

In various embodiments the instant noodles comprise a final moisture content substantially in the range of 0.4% to 15%.

In various embodiments the antioxidant of the instant noodles is selected from alpha-carotene, beta-carotene, lycopene, lutein, alpha-tocopherol, gamma-tocopherol, tocotrienols, retinol, coenzyme Q10, alliin, allicin, diallyl disulfide, quercetin, protocatechuic acid, lignans, molecules obtained from *Allium* species or any combination thereof.

In various embodiments the fried oil flavour comprises a score between 2.5 to 17.5 using the scale described herein. For example, a score of 20 is equivalent to a fatty, oily, off taste, such as a rancid taste, and 0 is equivalent to absolutely to oily, fatty, fried taste, such as a floury taste, and 7.5 is equivalent to an oily taste, but not a fried taste and the range between 10 and 15 is equivalent to a nice oil fried taste. In various embodiments the fried oil flavour comprises a score between 3 to 17, or between 4 to 17, or between 5 to 17, or between 6 to 17, or between 7 to 17, or between 8 to 17, or between 5 to 16, or between 5 to 15, or between 5 to 14, or between 5 to 13, or between 10 to 15.

An advantage of the use of the combination of all-oil-inside the dough with a high velocity high temperature process and antioxidant ingredients produces noodles with a substantially lower oil content but yet with a comparable or even higher fried oil flavour than in today's commercially available noodles.

Another aspect of the invention comprises a food product obtained by the process described herein.

As used herein like terms have the same meaning as used to describe other aspects or embodiments of the invention.

In various embodiments the food product comprises pasta. In various embodiments the food product comprises a baked or fried dough-based confection. In various embodiments the food product comprises a dough-based dim sum item.

Another aspect of the invention comprises an antioxidant blend for use in a dough-based product including noodles with enhanced fried oil flavour comprising an antioxidant; combinable with a flour and a water-based liquid to make a dough comprising oil in the range of 0.06% to 15% with respect to the weight of the flour; and instructions for making the dough.

As used herein like terms have the same meaning as used to describe other aspects or embodiments of the invention.

In various embodiments the antioxidant is plant derived.
In various embodiments the antioxidant is oil-soluble.

In various embodiments the antioxidant is selected from alpha-carotene, beta-carotene, lycopene, lutein, alpha-tocopherol, gamma-tocopherol, tocotrienols, retinol, coenzyme Q10, alliin, allicin, diallyl disulfide, quercetin, protocatechuic acid, lignans, molecules obtained from *Allium* species or any combination thereof.

In various embodiments the antioxidant blend further comprises an oil.

In various embodiments the oil is selected from sunflower oil, sesame seed oil, flaxseed oil, olive oil, oils extracted from roasted oil seeds such as sunflower, sesame and flaxseed, fractions of palm oil, palmolein, crude palm oil, refined bleached deodorized palm oil, onion-infused oil, garlic-infused oil, fried garlic oil, fried onion oil, pre-fried oil, or any combination thereof. In various embodiments the fried garlic oil or fried onion oil comprises endogenous oil extracted from garlic or onion and fried. In various embodiments the fried garlic oil or fried onion oil comprises garlic or onion fried with non-endogenous oils such as palmolein or any other oil mentioned herein. In various embodiments the flaxseed oil comprises omega-3 fatty acids, alpha-linoleic acid, docosahexaenoic acid, eicosapentaenoic acid.

In various embodiments the antioxidant is dispersed within the oil.

In various embodiments the antioxidant is homogenously mixed with a flour.

Another aspect of the invention comprises a method of making noodles with a health benefit comprising: (a) preparing a dough comprising an antioxidant, flour, oil in the range of 0.06% to 15% with respect to the weight of the flour; and a water-based liquid; (b) shaping the dough; (c) placing the shaped dough in a chamber (d) gelatinising the flour and cooking the dough at a combined temperature-time measurement of about 300-2100 units, wherein at least one stage of the cooking comprises circulating a stream of air at a temperature of 100° C. or above and a speed of 1 metres per second or above; wherein the oil is incorporated into the dough without any external application of oil to the shaped dough prior to gelatinizing and cooking.

As used herein the health benefit may include but is not limited to oil that is not likely to include carcinogenic compounds that may become present in oil that is used to re-fry multiple batches of noodles. Health benefit may also include a noodle with a lower oil content and lower calorie amount than conventional noodles for people that need to reduce oil and/or calories in their diet for health reasons.

As used herein like terms have the same meaning as used to describe other aspects or embodiments of the invention.

Another aspect of the invention comprises a dough for making food products with enhanced fried oil flavour comprising flour, an oil in the range of 0.06% to 15% with respect to the weight of the flour; and a water based liquid wherein the dough contains an antioxidant and the oil is incorporated into the dough.

As used herein like terms have the same meaning as used to describe other aspects or embodiments of the invention.

Another aspect of the invention comprises a dough for making noodles with enhanced fried oil flavour comprising flour, an oil in the range of 0.06% to 15% with respect to the weight of the flour; and a water based liquid wherein the dough contains an antioxidant and the oil is incorporated into the dough.

As used herein like terms have the same meaning as used to describe other aspects or embodiments of the invention.

In various embodiments the weight percentage of oil in the dough may comprise about 0.25% to 15%, 0.5% to 15%, 0.75% to 15%, 1% to 15%, or 1% to 14%, 1% to 13%, 1% to 12%, 1% to 11%, 1% to 10%, 1% to 9%, 1% to 8%, 1% to 7%, 1% to 6%, or 2% to 15%, 2% to 14%, 2% to 13%, 2% to 12%, 2% to 11%, 2% to 10%, 2% to 9%, 2% to 8%, 2% to 7%, 2% to 6%, or 3% to 15%, 3% to 14%, 3% to 13%, 3% to 12%, 3% to 11% 3% to 10%, 3% to 9%, 3% to 8%, 3% to 7%, 3% to 6%, or 4% to 15%, 4% to 14%, 4% to 13%, 4% to 12%, 4% to 11%, 4% to 10%, 4% to 9%, 4% to 8%, 4% to 7%, 4% to 6%, or 5% to 15%, 5% to 14%, 5% to 13%, 5% to 12%, 5% to 11%, 5% to 10%, 5% to 9%, 5% to 8%, 5% to 7%, 5% to 6%. In various embodiments the oil % w/w is measured by the Soxhlet method.

In various embodiments the dough further comprises improvers which improve the quality of the dough either in terms of mouthfeel, final oil-fried taste, or water-binding capacity as described herein.

The use of doughs that contain all the oil or oils used as ingredients, mixed into and dispersed within the dough greatly enhances the fried oil flavour of the resulting food product while minimizing the amount of oil content of the product.

Another aspect of the invention comprises noodles with enhanced fried oil flavour comprising an antioxidant and a final oil content substantially in the range of 0.06% to 15%.

As used herein like terms have the same meaning as used to describe other aspects or embodiments of the invention.

In various embodiments the noodles comprise a final moisture content substantially in the range of 0.4% to 15%.

In various embodiments the instant noodles comprise a natural yellow colour derived from an antioxidant.

In various embodiments the antioxidant is selected from alpha-carotene, beta-carotene, lycopene, lutein, alpha-tocopherol, gamma-tocopherol, tocotrienols, retinol, coenzyme Q10, alliin, allicin, diallyl disulfide, quercetin, protocatechuic acid, lignans, molecules obtained from *Allium* species or any combination of the same.

In various embodiments the noodles comprise a fried oil flavour score between 2.5 to 17.5 using the scale described herein. In various embodiments the fried oil flavour comprises a score between 3 to 17, or between 4 to 17, or between 5 to 17, or between 6 to 17, or between 7 to 17, or between 8 to 17, or between 5 to 16, or between 5 to 15, or between 5 to 14, or between 5 to 13, or between 10 to 15.

In response to the need for new forms of healthy foods such as noodles a new method has been devised and results in different types of healthy noodles.

One is a new form of fried noodle with a very significantly reduced fat content, making it a healthier food that will be preferred by many consumers. The significantly lower concentrations of oil incorporated into the noodle products produced by the novel process not only reduce manufacturing costs but also create for the first time a much healthier food product; with the healthiness of the noodles being roughly proportional to the extent to which operating costs have been reduced and vice versa. The new process reduces the uptake of oil by the noodles during frying simply by adding a small quantity of refined, crude, fresh, re-fried, or a combination of such edible oils into the noodle dough, with air heaters that are used instead to cook the noodles instead of deep fryers. A key requirement of this novel form of fried noodles is maintaining a fried aroma and taste while minimising their oil contents and a number of approaches have been devised that can be used individually or in combination to achieve this including, but not limited to, the use of oils that have been pre-fried, the use of less refined forms of oils, the addition of emulsifier, the addition of protein such as gluten and the reheating of the noodles.

This new process can use absolutely fresh oil or mixtures of oils, and so can eliminate any rancid or otherwise unwanted flavour notes present in deep-fried noodles due to their containing large quantities of oil that has already been used to fry many batches of noodles. The process also eliminates any undesirables such as acrylamide as specified by the World Instant Noodles Association (WINA) recommendations that are present in deep-fried noodles due to their containing large quantities of oil that has already been used to fry many batches of noodles, some of which enters each noodle during cooking to replace the water released from the noodles as vapour during the frying process, thus becoming part of the noodle that is eaten.

This new process allows for the oil added inside to be easily thoroughly mixed into the dough, making it evenly distributed and so maximizing its effectiveness so that a minimum amount of oil has to be added, and consequently a minimum amount of final oil content in the final noodle product.

This new process also eliminates the need for a steaming step and probably cooling and drying steps in the process, and only requires minimal modification of production lines or capital expenditure by manufacturers. The new process will also be safer now that larger quantities of frying oil are no longer required, and the new process will also be more flexible, since the only limitation is now the size of batches of dough rather than the current large frying tanks. The novel approach also allows the organoleptic properties of noodles to be modified, making new forms available, and the new process can also be applied to other foods.

In addition, a major benefit of using the novel approach is that oil is the most expensive ingredient used in making noodles, so that the reductions achieved in oil uptake by the noodle dough create attractive pro rata cost savings for noodle manufacturers, together with pro rata improvements in the healthiness of the noodles produced. At the same time, the novel approach maintains the organoleptic qualities of the instant noodles, giving them a comparable oil fried taste to conventional deep fried noodles, and also having comparable mouthfeel characteristics. Thus the novel approach provides noodle manufacturers with three compelling and complementary advantages, enabling them to differentiate their products and create new healthy product opportunities while reducing their costs.

The second approach to making healthier noodles is to use the same air heating process as above to increase the production rate of air dried noodles that do not have a fried taste, so that they are finished in a much shorter time, typically around 10 minutes, than in the current air drying process, that takes a minimum of 30 minutes. This greatly increases the rate at which air dried noodles can be made as well as reducing the cost of making air dried-style noodles that contain only the very small amounts of oil, much less than 1%, that are naturally present in the original flour used to make them since most flours contain a small quantity of endogenous oil which we have assessed for wheat flours as being from 0.06 to 0.24%. However very small additional quantities of oil can be added so as to enhance the heat transfer characteristics of the dough and so to accelerate the rate of cooking provided that the overall oil concentration in the dough is still insufficient to generate a cooked flavour.

Furthermore the choice of added oil, such as crude palm oil can also contribute an improvement to the colour of the novel air-dried noodles made. If required the novel process makes it possible to add flavours to the dough used to make this extremely low fat and therefore healthy type of noodle more attractive to consumers; with them being converted into flavour volatiles by the high temperature of cooking, and a number of additional ways to improve the healthiness of noodles have been identified.

These novel processes have been successfully operated to prove that the new process does not affect the yields of product, and that the novel noodles produced are organoleptically very similar to current noodle products in terms of appearance, mouth-feel, elasticity, 'first bite' characteristics, flavour and other characteristics.

In addition the novel approach has been applied to a range of other food products such as doughnuts, gyoza, and a variety of pasta products.

Described is fried and air dried forms of noodles and other foods, especially low oil fried forms, new uses for them, and the novel process used to make them. The process involves incorporating refined, crude, fresh, re-fried, or a combination of such edible oils and alkaline water preferably at a concentration of approximately 38 g per 100 g of flour, with other ingredients such as salt, emulsifiers, enzymes, and/or hydrocolloids. The range of oils used may include unrefined crude palm oil, refined, bleached and deodorized palm oil, palmolein, rice bran, oil, soy oil, sunflower oil, sesame oil, mustard oil, olive oil and other similar vegetable oils used to make noodles, and then cooking the noodles using the oil incorporated in them, by exposing the noodles to a high speed stream of hot air to produce noodle products with mouthfeel, taste, colour and moisture contents and other organoleptic properties comparable to current products. The novel process greatly reduces the quantities of oil required, eliminates the need for a separate steaming operation in the process, and so reduces the complexity of the process and the risks associated with the use of hot oil and hot steaming operations, and so reduces both the capital and operating costs of making noodles and other food products. This novel approach also enables additional benefits to be obtained such as the incorporation of other healthy ingredients and the creation of noodles with new flavours and improved colour.

Novel forms of fried and air-dried noodles and some other foods that are both healthier and lower cost due to their containing only low concentrations of oil, and optionally containing other healthy ingredients and/or that can be made with a range of flavours, especially fried flavours. These noodles are made by a novel process in which low concentrations of a variety of different oils are completely mixed into doughs made using a variety of different flours and heated in a high velocity stream of hot air without any previous steaming step in the process because the gelatinisation of the starch being carried out during the initial stages of the heating process. The processes to make these fried and air-dried noodles have reduced operating cost due to the lower amount of oil required for frying noodles and the reduced heating times required to make the air-dried noodles, and reduced capital costs due to the elimination of frying and steaming equipment from the processes to make them.

The novel noodles and the processes to make them that are the subject of this invention contain added oil concentrations from between zero to 15% oil, all of which is thoroughly mixed into the dough from which the noodles are made that principally consist of flour and alkaline water, so that the oil is thoroughly dispersed in the final noodles.

This approach enables fried noodles containing very low concentrations of oil to be made by adding from as little as 0.25% oil, far lower than the lowest oil concentrations currently present in fried noodles, with 12% oil being the lowest oil content of fried noodles currently commercially available which are all made by deep frying of noodles in liquid oil, so that in practice the use of oil concentrations mixed into the dough from 0.25% to 15% results in fried noodles with final oil content of about from 0.5% to 15.5%, given that Soxhlet analyses of final oil content are typically within the range of ±0.1% to 1% of liquid oil added. In addition, based on our data [not shown], for every 1% of oil added to the dough an average of about 0.93% is measured in the final product via Soxhlet analyses. Hence, the ratio of oil include in the dough to the amount oil in the final product is about 1:0.9 to about 1:2. This has the advantage of allowing manufacturers a high level of control over what the final oil content of any noodle product will be prior to cooking. The novel approach also enables air-dried noodles containing extremely low concentrations of oil to be made by only supplementing the very low and rather variable amounts of oil naturally present in the flour used to make the noodles with sufficient oil to improve the heat transfer characteristics of the noodle dough so as to accelerate the cooking of the noodles, but without adding so much oil that the total oil, present from both the naturally present oil and the added oil, is high enough to generate a fried flavour. Thus the maximum oil concentration in the novel air-dried noodles dough from both sources should not exceed 0.8%.

The uncooked noodles prepared as above are cooked in a stream of very rapidly circulated hot air in which they are fried internally by the fresh oil that has been incorporated into the dough, and without any external application of oil whatsoever, using equipment such as air heaters such as supplied by Phillips on a laboratory scale, and on a larger scale tunnel ovens, fluidised-bed dryers and the THERMO-ZONE vertical air impingement equipment manufactured by the Arakawa Company Ltd. of Nagoya, Japan. The novel process uses hot air moving at high velocities, and so creating high heat transfer rates into the noodles especially when the noodles contain oil, which has a lower specific heat capacity than water.

Use of this novel method eliminates the need for the preliminary steaming or other associated operations necessary to gelatinise the starch in the uncooked noodles prior to frying which is standard in current manufacturing processes for fried noodles. This is because when using the novel process gelatinisation takes place in the first stage of the process as the temperature of the noodles increases and eventually exceeds the gelatinisation temperature of the starch before it becomes hot enough for the oil incorporated to fry the noodles from inside. Or the process can be carried out in two stages first at a lower temperature of around 100° C. sufficient to achieve gelatinisation, and then in a second stage at a temperature of around 150° C. that is sufficient to fry the noodles. Or the lower temperature setting of around 140° C. (creating a product core temperature of around 100° C.) sufficient to achieve gelatinisation, and then in a second stage, or additional stages, at a temperature of around 150° C. to 190° C. that is sufficient to fry the noodles.

The use of this new method also allows for the instant noodle to be prepared either by boiling in water for 3 minutes as per pillow packet noodles, or by immersing in boiled water for 3 minutes as per cup noodles, or any amount of time that allows suitable rehydration.

Example 1

100 g of flour (Prima Flour) is weighed into a mixing bowl. 0.3 g of guar gum is added into the flour. The flour is mixed for 30 seconds with a Philips HR1456 hand-held mixer at setting 1. After this, 6 g refined palmolein oil (Turkey Brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 2.5 minutes with 100 mL of 100° C. boiling water placed at the bottom of the tray of air fryer. After preheating, the noodles are then as loosely spread out as possible in a Philips air fryer for 1.5 minutes without switching off the air fryer. After 1.5 minutes, the air fryer is then switched off and the noodles are rested in the air fryer for 30 seconds. After 30 seconds of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 160° C. for 3 minutes. The temperature is then increased to 200° C. for 1 minute. After this, the noodles are immediately removed and placed in open air to cool.

Example 2

100 g of flour (Prima Flour) is weighed into a mixing bowl. 0.3 g of guar gum is added into the flour. The flour is mixed for 30 seconds with a Philips HR1456 hand-held mixer at setting 1. Fried Asian Garlic oil is made by frying 33 g of raw, grounded and sliced Asian garlic with 100 g of refined palmolein oil (Turkey Brand) at 220° C. for 5 minutes. After this, 0.3 g of refined palmolein oil and 0.2 g fried Asian garlic oil is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 35 g of 1% kansui solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 0.5 minutes without switching off the air fryer. After 0.5 minute, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 6.5 minutes. The temperature is then increased to 160° C. for 1.5 minutes. After this, the noodles are immediately removed and placed in open air to cool.

Example 3

100 g of flour (Prima Flour) is weighed into a mixing bowl. 0.3 g of guar gum is added into the flour. The flour is mixed for 30 seconds with a Philips HR1456 hand-held mixer at setting 1. After this, 5 g of crude palm oil (CPO) is slowly added into the mixing bowl, while mixing for 1 minute. A 0.2% kansui solution is made from a kansui mix, comprising of 90% iodised salt, sodium pyrophosphate anhydrous, sodium carbonate and potassium carbonate. 1 g of salt (Pagoda Brand) is added into 33 g of 0.2% kansui solution and stirred to dissolve it completely. The resultant solution is then slowly added into the mixing bowl, while mixing for 4.5 minutes. The dough is kneaded slightly together and rested for 1 minute. It is then sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 4

100 g of flour (Prima Flour) is weighed into a mixing bowl. 0.1 g of guar gum, magnesium silicates 0.2 g Dalsorb®F50 and 0.8 g of Dalsorb®CM300 are added into the flour. The flour is mixed for 30 seconds with a Philips HR1456 hand-held mixer at setting 1. After this, 6.5 g of super refined palmolein (Harmuni Brand) is mixed with 1.5 g of crude palm oil (CPO) and then the mixture is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1.5 g of salt (Tata Brand) and 0.1 g of egg yellow colouring (Bake King Brand) are added into 30 g of 1% kansui solution (1 g of kansui mix diluted with 100 g of drinking water) and stirred to dissolve them completely. The solution is then slowly added into the mixing bowl, while mixing for 4.5 minutes.

The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). A Tefal Serie SO4 steamer (Model 100215/90) is preheated for 5 minutes at 100° C. The cut noodles are steamed at 100° C. for 2 minutes. The Philips air fryer is preheated at 170° C. for 4 minutes. The noodles are then as loosely spread out as possible in a Philips air fryer. It is then heated with circulated High Velocity hot air passing through it at 170° C. for 1 minute. The temperature is then increased to 140° C. for 4 minutes. After this, the noodles are immediately removed and placed in open air to cool.

Example 5

100 g of flour (Prima Flour) is weighed into a mixing bowl. 0.3 g of guar gum is added into the flour. The flour is mixed for 30 seconds with a Philips HR1456 hand-held mixer at setting 1. After this, 1 g of pure white sesame oil (Chee Seng Brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and rested for 1 minute. It is then sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 6

100 g of flour (Prima Flour) is weighed into a mixing bowl. 0.3 g of guar gum is added into the flour. The flour is mixed for 30 seconds with a Philips HR1456 hand-held mixer at setting 1. The toasted sunflower seed oil is made by pan-toasting raw sunflower seeds for 35 minutes and air-frying for 3 minutes at 160° C. The toasted sunflower seeds are then blended into powder form using a blender (Akira brand). 40 g of sunflower oil is pre-heated. Once the oil is heated up, 10 g of powdered dried sunflower seeds are added into the oil and fried at 240° C. for 15 minutes. After this, 6 g toasted sunflower seed oil is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 7

100 g of flour (Prima Flour) is weighed into a mixing bowl. 0.3 g of guar gum is added into the flour. The flour is mixed for 30 seconds with a Philips HR1456 hand-held mixer at setting 1. After this, 6 g flaxseed oil is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 8

100 g of flour (Prima Flour) is weighed into a mixing bowl. 0.3 g of guar gum is added into the flour. The flour is mixed for 30 seconds with a Philips HR1456 hand-held mixer at setting 1. After this, 0.00125 g lycopene (Synthite Brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 9

100 g of flour (Prima Flour) is weighed into a mixing bowl. 0.3 g of guar gum is added into the flour. The flour is mixed for 30 seconds with a Philips HR1456 hand-held mixer at setting 1. After this, a mixture of 0.0019 g beta-carotene (TCI Brand) and 6 g refined palmolein oil (Turkey Brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 10

100 g of flour (Prima Flour) is weighed into a mixing bowl. 0.3 g of guar gum is added into the flour. The flour is mixed for 30 seconds with a Philips HR1456 hand-held mixer at setting 1. After this, a mixture of 0.0313 g Vitamin A (Holland & Barrett Brand) and 6 g refined palmolein oil (Turkey Brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 11

100 g of flour (Prima Flour) is weighed into a mixing bowl. 0.3 g of guar gum is added into the flour. The flour is mixed for 30 seconds with a Philips HR1456 hand-held mixer at setting 1. After this, a mixture of 0.0019 g beta-carotene (TCI Brand) and 0.0155 g D-α-tocopherol (TCI Brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 12

100 g of flour (Prima Flour) is weighed into a mixing bowl. 0.3 g of guar gum is added into the flour. The flour is mixed for 30 seconds with a Philips HR1456 hand-held mixer at setting 1. After this, a mixture of 0.0155 g D-α-tocopherol (TCI Brand) and 6 g refined palmolein (Turkey Brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 13

100 g of flour (Prima Flour) is weighed into a mixing bowl. 0.3 g of guar gum is added into the flour. The flour is mixed for 30 seconds with a Philips HR1456 hand-held mixer at setting 1. After this, 2 g raw, minced garlic (Garlic cloves were sliced, minced and used immediately) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 14

100 g of flour (Prima Flour) is weighed into a mixing bowl. 0.3 g of guar gum is added into the flour. The flour is mixed for 30 seconds with a Philips HR1456 hand-held mixer at setting 1. Fried Asian Garlic oil is made by firstly air-frying thinly sliced Asian garlic using a Philips air fryer at 120° C. for 16 minutes. The dehydrated garlic is then blended into powder form using a blender (Akira brand). 10 g of powdered dehydrated garlic are added into 40 g of refined palmolein oil (Turkey Brand) and fried at 220° C. for 5 minutes. After this, 6 g of fried Asian Garlic Oil is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 15

100 g of flour (Prima Flour) is weighed into a mixing bowl. 0.3 g of guar gum is added into the flour. The flour is mixed for 30 seconds with a Philips HR1456 hand-held mixer at setting 1. Palmolein (Turkey Brand) is mixed with the extracted alliin (via solvent extraction using dialysis tubing) from microwaved Asian garlic. Ethyl acetate (Food Grade) is used as the solvent. After this, 6 g palmolein with extracted alliin is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 16

100 g of flour (Prima Flour) is weighed into a mixing bowl. 0.3 g of guar gum is added into the flour. The flour is mixed for 30 seconds with a Philips HR1456 hand-held mixer at setting 1. After this, 2 g raw, minced onion (Onions were sliced, minced and used immediately) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 17

100 g of flour (Prima Flour) is weighed into a mixing bowl. 0.3 g of guar gum is added into the flour. The flour is mixed for 30 seconds with a Philips HR1456 hand-held mixer at setting 1. Fried onion oil is made by firstly air-frying with a Philips air fryer thinly sliced onions at 120° C. for 16 minutes. These dehydrated onions are then blended into powder form using a blender (Akira Brand). 10 g of powdered dehydrated onions are added into 40 g of refined palmolein oil (Turkey Brand) and fried at 220° C. for 5 minutes. After this, 6 g fried onion oil is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 18

100 g of flour (Prima Flour) is weighed into a mixing bowl. 0.3 g of guar gum is added into the flour. The flour is mixed for 30 seconds with a Philips HR1456 hand-held mixer at setting 1. Onion-infused oil is made by mixing raw, minced onion with palmolein (Turkey Brand) in the ratio 1:1.5. The mixture is left to incubate overnight at room temperature. The oil is then separated from the onion bits. After this, 6 g of Onion-infused oil is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as of the conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C.

for 2 minutes. After this, the noodles are immediately removed and placed in open air to cool.

Example 19

100 g of flour (Prima Flour) is weighed into a mixing bowl. 0.3 g of guar gum is added into the flour. The flour is mixed for 30 seconds with a Philips HR1456 hand-held mixer at setting 1. After this, 0.905 g quercetin (Holland & Barrett Brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as of the conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 20

100 g of flour (Prima Flour) is weighed into a mixing bowl. 0.3 g of guar gum is added into the flour. The flour is mixed for 30 seconds with a Philips HR1456 hand-held mixer at setting 1. After this, a mixture of 0.00075 g lycopene (Synthite Brand), 0.5 g raw, minced onion and 0.5 g raw, minced garlic is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 21

100 g of flour (Prima Flour) is weighed into a mixing bowl. 0.3 g of guar gum is added into the flour. The flour is mixed for 30 seconds with a Philips HR1456 hand-held mixer at setting 1. After this, 0.08025 g of Lutein (Holland & Barrett Brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is then sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as of the conventionally steamed noodles. The hot water that was initially placed at the bottom of the tray of air fryer is removed from the air fryer. The noodles are then air heated at 140° C. for 4 minutes. The temperature is then increased to 160° C. for 2 minutes. After this, the noodles are immediately removed and placed in open air to cool.

Example 22

100 g of flour (Prima Flour) is weighed into a mixing bowl. 0.3 g of guar gum is added into the flour. The flour is mixed for 30 seconds with a Philips HR1456 hand-held mixer at setting 1. After this, a mixture of 6 g refined palmolein oil (Turkey Brand), 0.5 g raw, minced onion and 0.5 g raw, minced garlic is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 23

100 g of flour (Prima Flour) is weighed into a mixing bowl. 0.3 g of guar gum is added into the flour. The flour is mixed for 30 seconds with a Philips HR1456 hand-held mixer at setting 1. After this, a mixture of 0.00062 g beta-carotene (TCI Brand), 1 g pure white sesame seed oil (Chee Seng Brand) and 1 g raw, minced onion is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 24

Only pre-trained subjects and panelists according to the benchmarks and intensities are selected for sensory evaluation of the noodle cake. Panelists are handed a tasting sheet. The noodle sample is usually sealed in a plastic pouch. The plastic pouch is first cut open and passed to the trained panelists to smell the noodle cake. An industry known molecule for fried flavour, t2, t4 decadienal is used as a benchmark for comparison. In addition, commercial noodles are also used as a range of benchmarks against the t2, t4 decadienal to aid the panelist in assessment. The benchmark for intensity by smelling is shown below:

| Concentration prepared % w/w flour and ppm | Results of Smelling |
|---|---|
| 0% (0 ppm) | Raw noodle smell, flour smell |
| 0.001% (10 ppm) | Raw floury smell slightly rancid note no fried smell |

-continued

| Concentration prepared % w/w flour and ppm | Results of Smelling |
|---|---|
| 0.005% (50 ppm) | Flour smell very slight fried note |
| 0.01% (100 ppm) | Some floury smell Oily note slight fried smell (reminds of rancid) |
| 0.05% (500 ppm) | Very slight floury smell Oily note fried note (slight rancid smell) |
| 0.08% (800 ppm) | oily smell slight fried smell Slight chemical, raw green note |
| 0.1% (1,000 ppm) | oily smell Nice fried smell |
| 0.5% (5,000 ppm) | some rancid smell fried smell Chemical, raw green note (overpowered) |
| 1% (10,000 ppm) | Rancid green smell negative note |

The host then cooks the noodle as follows. Firstly, heat approximately 500 g of water till boiling. When the water is boiling, add in the noodles and cook it for 3 minutes. After 3 minutes, the noodles are ready to serve. They are eaten as is (in neat), without any seasoning to understand the intrinsic taste of the noodle. After which, the sample is tasted in neat and assessed for Fatty taste in Neat.

Example 25

Sensory evaluations were made on noodle samples based on Example 23. Upon comparing these samples sensory rankings, certain combinations of noodles as made in the invention described herein able to demonstrate a greater fried oil flavour, as opposed to a noodle made with only 6 g palmolein incorporated into and dispersed throughout the dough. For example, FIG. 3. shows a noodle sample containing raw, minced garlic incorporated into and dispersed throughout the dough was ranked higher in fatty taste. Similar results were achieved for tocopherol and a range of other antioxidants incorporated into and dispersed within the dough (data not shown).

Example 26

Combined Time-Temperature Measurement Trials

A range of combined time-temperatures were tested based on the following:

TABLE 1

9 different processing methods, the time and the temperature used in cooking each noodle batch and the calculated area under the curve for each noodle batch.

| No | Cooking temperatures and times | Area under the curve |
|---|---|---|
| 1 | Cooking at 140° C. for 3 minutes | 300 |
| 2 | Gelatinisation setting at 180° C. for 1.5 minutes, followed by a rest period (static gelatinisation stage) of 0.5 minutes, and cooking at 160° C. for 1 minute, and 200° C. for 1 minute | 465 |
| 3 | Gelatinisation setting at 180° C. for 1.5 minutes, followed by a rest period (static gelatinisation stage) of 0.5 minutes, and cooking at 160° C. for 3 minutes, and 200° C. for 1 minute | 725 |

TABLE 1-continued 9 different processing methods, the time and the temperature used in cooking each noodle batch and the calculated area under the curve for each noodle batch.

| No | Cooking temperatures and times | Area under the curve |
|----|-------------------------------|----------------------|
| 4 | Gelatinisation setting at 180° C. for 0.5 minutes, followed by a rest period (static gelatinisation stage) of 1 minute, and cooking at 140° C. for 4 minutes, and 160° C. for 2 minutes. | 803 |
| 5 | Gelatinisation setting at 180° C. for 0.5 minutes, followed by a rest period of 1 minute, and cooking at 140° C. for 4 minutes, and 160° C. for 2 minutes | 850 |
| 6 | Rest period (static gelatinisation stage) of 1 minute, and cooking at 140° C. for 6 minutes, and 160° C. for 2 minutes. | 950 |
| 7 | Gelatinisation setting at 180° C. for 1.5 minutes, followed by a rest period of 0.5 minutes, and cooking at 140° C. for 9 minutes, and 160° C. for 5 minutes | 1765 |
| 8 | Gelatinisation setting at 180° C. for 0.5 minutes, followed by a rest period of 1 minute, and cooking at 140° C. for 9 minutes, and 160° C. for 5 minutes | 2100 |

Figure 2:
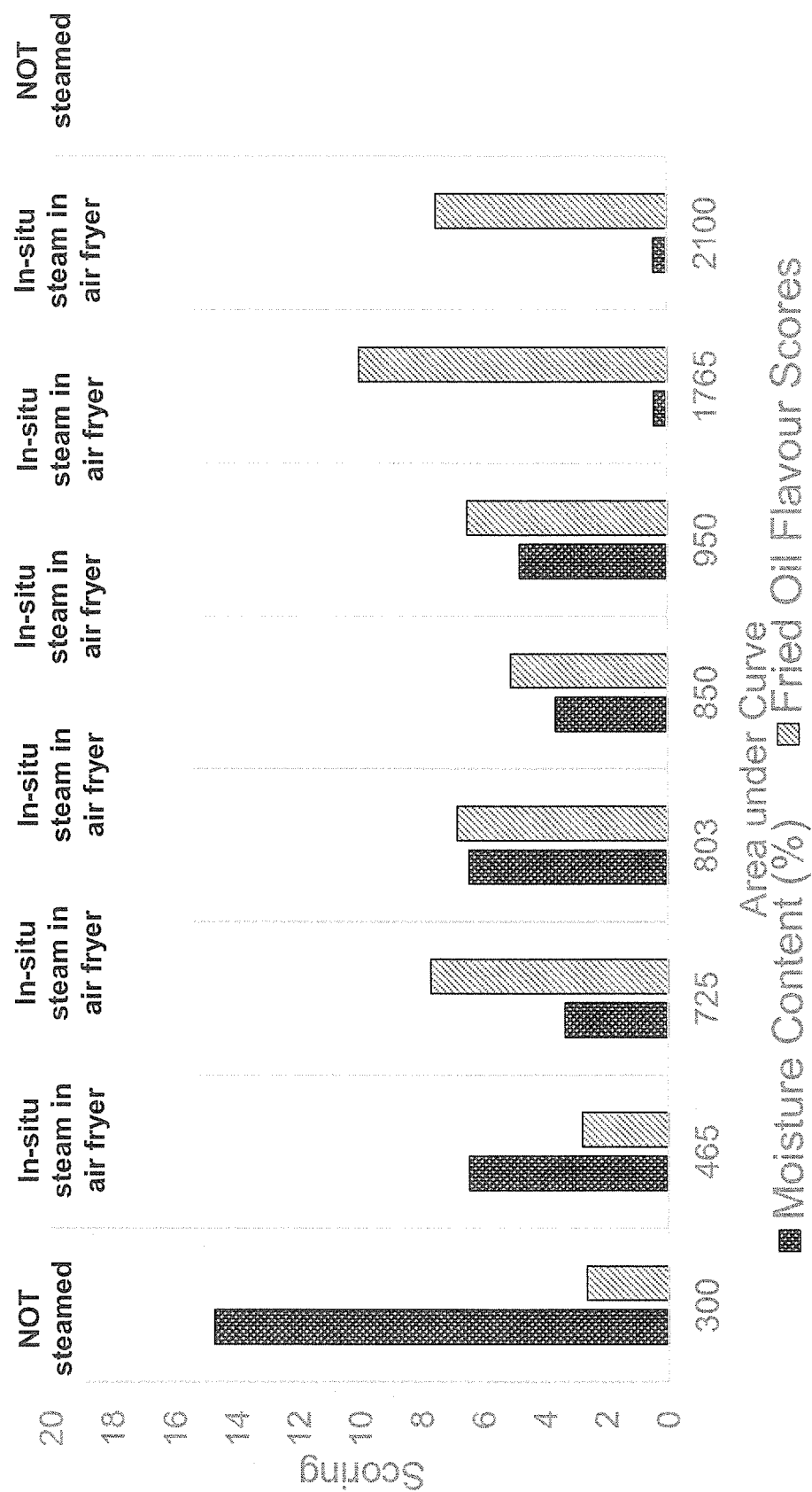
FIG. 2. An example of fried oil flavour scores and moisture contents of noodles over a range of combined temperature-time measurements represented as areas under the curve for noodles made containing only oil incorporated into the dough without any added antioxidants.

The dough was prepared the same way in all 8 samples. 100 g of flour was used and mixed with 0.3 g of guar gum for 30 seconds. 6 g of refined palmolein (Turkey Brand) was added in and mixed for 1 minute. 35 g of a 1% Kansui solution (90% iodised salt, sodium pyrophosphate anhydrous, sodium carbonate, potassium carbonate in water resulting in pH from 10 to 11) was added. 1 g of salt is added to the Kansui solution prior to mixing the solution into the dough. The dough is kneaded slightly and sheeted with a Marcato brand (model Ampia 180) noodle maker. The dough is sheeted at dial 1 for 3 times; dial 3 for 2 times; and finally at dial 6 for 1 time to achieve 1 mm thickness. The dough sheet is passed through the noodle cutter to produce noodles 1 mm by 1.3 mm. The results indicated that the fried oil flavour increases gradually with the area under the curve to about 8-9 but is still not in the range of 10 to 15 which is in the preferred range, and the addition of an antioxidant is required to develop the fried oil flavour (FIG. 2).

Figure 3:
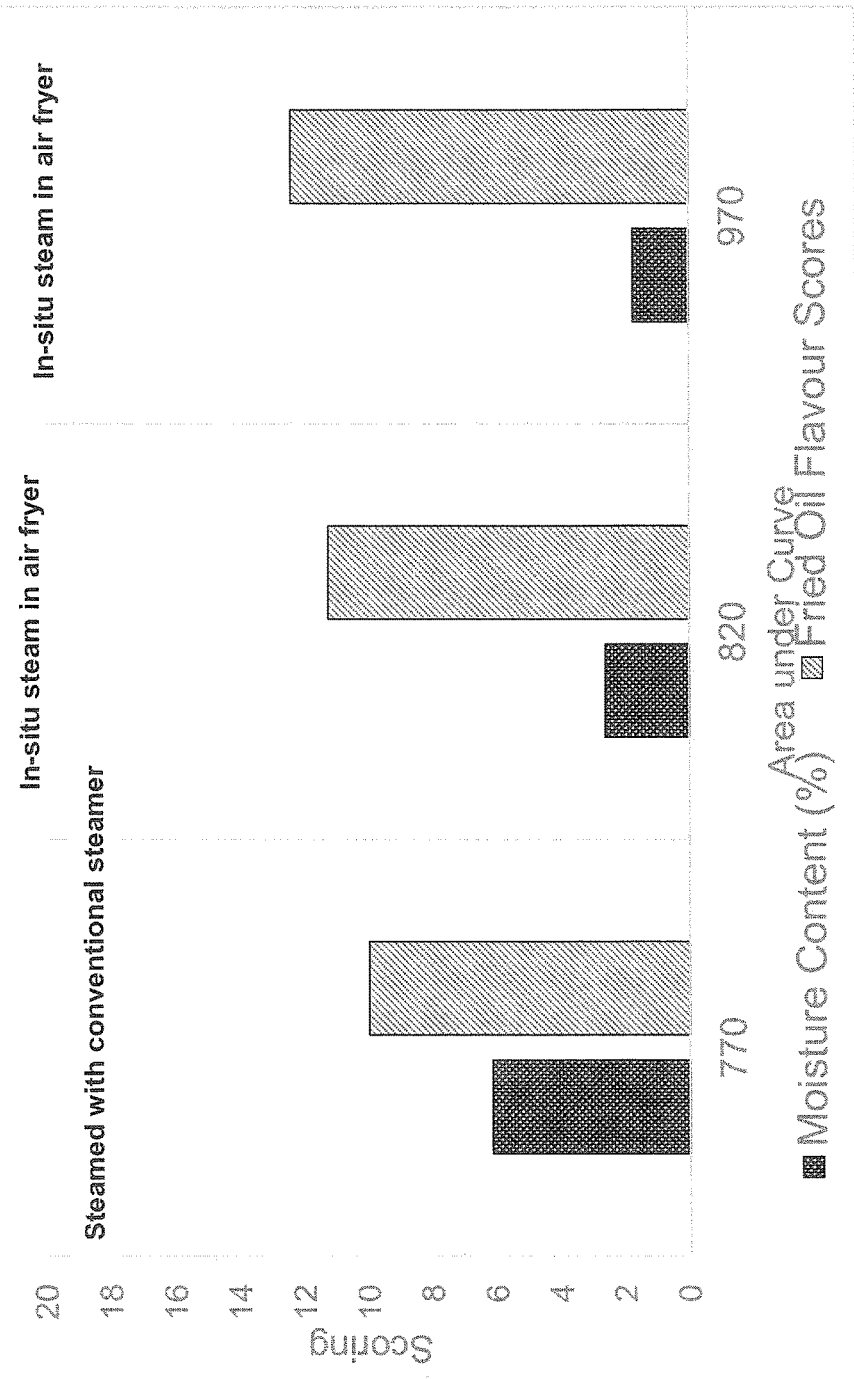
FIG. 3. An example of fried oil flavour scores and moisture contents of noodles over a range of combined temperature-time measurements represented as areas under the curve for noodles made containing garlic as an added source of antioxidant.
Figure 4:
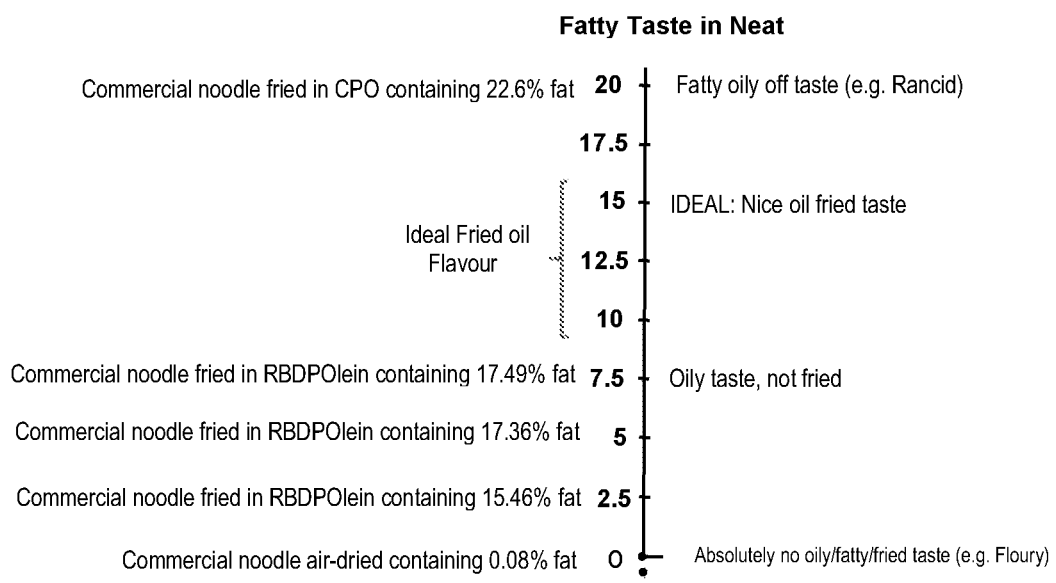
FIG. 4. A chart showing the results obtained in Example 24.

This was tested further by adding garlic as an antioxidant cooked over a range of combined temperature-time unit of the area under the curve from about 700 to 1000 whereby the fried oil flavour is in the range of 10 to 15 which is in the preferred range (FIG. 3).

The preferred moisture content is about 6 to 7 which is achieved at a combined temperature-time unit of the area under the curve of between 400 and 1000 units without the antioxidant and about 700 to 800 units with the antioxidant.

Example 27

100 g of flour (Prima Flour) is weighed into a mixing bowl. 0.3 g of guar gum is added into the flour. The flour is mixed for 30 seconds with a Philips HR1456 hand-held mixer at setting 1. After this, a mixture of 0.045 g shallot flavour (Flavors Brand) and 0.045 g garlic onion flavour (Flavors Brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 28

100 g of flour (Prima Flour) is weighed into a mixing bowl. 0.3 g of guar gum is added into the flour. The flour is mixed for 30 seconds with a Philips HR1456 hand-held mixer at setting 1. Fried Asian Garlic oil is made by firstly air-frying thinly sliced Asian garlic using a Philips air fryer at 120° C. for 16 minutes. The dehydrated garlic is then blended into powder form using a blender (Akira Brand). 10 g of powdered dehydrated garlic are added into 40 g of refined palmolein oil (Turkey Brand) and fried at 220° C. for 5 minutes. After this, a mixture of 0.007 g shallot flavor (Flavors Brand) and 0.05 g fried Asian garlic oil is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 180° C. for 10 minutes with 100 mL of 100° C. boiling water placed at the bottom of the tray of air fryer. After preheating, the noodles are then as loosely spread out as possible in a Philips air fryer for 30 seconds without switching off the air fryer. After 30 seconds, the air fryer is then switched off and the noodles are rested in the air fryer for 1 minute. After 1 minute of resting in the air fryer, the noodles are loosely massaged to create similar 'volume' as the conventionally steamed noodles. The hot water that was initially placed at the bottom of the tray of air fryer is removed from the air fryer. The noodles are then heated with circulated High Velocity hot air passing through it at 140° C. for 4 minutes. The temperature is then increased to 160° C. for 2 minutes. After this, the noodles are immediately removed and placed in open air to cool.

Example 29

100 g of flour (Prima Flour) is weighed into a mixing bowl. 1 g of tapioca starch (Flying Man Brand) is added into the flour. The flour is mixed for 30 seconds with a Philips HR1456 hand-held mixer at setting 1. After this, 0.5 g of crude palm oil (CPO) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1.2 g of salt (Pagoda Brand) is added into 37.5 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air fryer is preheated at 140° C. for 10 minutes with 85 mL of 100° C. boiling water placed at the bottom of the tray of air fryer. After that, the noodles are as loosely spread out to create similar 'volume' as the conventionally steamed noodles and rested in the air fryer for 1 minute. The noodles are then heated with circulated High Velocity hot air passing through it at 140° C. for 6 minutes. The temperature is then increased to 160° C. for 2 minutes. After this, the noodles are immediately removed and placed in open air to cool.

Example 30

200 g of semolina flour (Prima Brand) was combined with 0.5 teaspoons of salt (Tata Brand) into a mixing bowl. A well is created in the flour and 1.5 eggs (Pasar Brand) is added into the flour. Then, 5 g of olive oil (FairPrice 100% Pure Olive Oil) is added. The combination is mixed with a tablespoon until the ingredients become a dough mass. Following this, the dough mass is mixed and kneaded by hand for 10 minutes. The dough is wrapped in a plastic Ziploc bag, and then left to rest for 1 hour. After 1 hour of resting, the dough is sheeted with a Marcato Brand (model Ampia 180) noodle maker. The dough is sheeted at dial 3 for 4 times, followed by sheeting at dial 6 for 1 time. After which, the dough sheet is either 1) passed through the wide cutter to produce linguine, 2) passed through the narrow cutter to produce spaghetti 3) cut into sheets to form lasagna sheets 4) folded into tortellini and 5) rolled into penne. The pasta is then placed in a Philips air fryer. Spaghetti are heated with circulated High Velocity hot air passing through it at 150° C. for 9 minutes. Linguine are heated with circulated High Velocity hot air passing through it at 150° C. for 10 minutes. The lasagna sheets, penne and tortellini are heated with circulated High Velocity hot air passing through it at 150° C. for 13 minutes. After this, they are immediately removed and placed in open air to cool. Pasta such as spaghetti and linguine were cooked in boiling water for 8 minutes. The penne and tortellini were cooked in boiling water for 10 minutes. The pastas were eaten with pasta sauce. Lasagna was cooked as follows. Ground beef, mushrooms, onions, and pasta sauce are cooked in a large skillet. In a separate bowl, mozzarella cheese and parmesan cheese were combined. A thin layer of meat sauce was spread in the bottom of a casserole deep dish, and then layered with uncooked lasagna sheets, cheese mixture, and followed by meat sauce again. The process is repeated until all ingredients are used, with approximately 0.5 cup of cheese mixture left. The deep dish is covered with aluminum foil and baked at 175° C. for 30 minutes. After 30 minutes, uncover and top with the remainder of cheese mixture. The lasagna is baked for another 15 minutes. The linguine was cooked in boiling water for 4 minutes and eaten with pasta sauce.

Example 31

210 g of white gram (Uncle Cook's Brand) is weighed into a bowl. It is then soaked in about 200 g of water for 3 hours until the white gram becomes soft. The white gram is blended into a thick paste form using a blender (Akira brand). A mixture of 3 green chilies, 2 stems of curry leaves, 10 g of thinly diced ginger, 1 teaspoon of whole black pepper, a small pinch of baking soda, 1 teaspoon of salt and 2 big sliced red onions are mixed into the paste until all ingredients are combined. This mixture is then left at room temperature for 1 hour for fermentation to occur. After 1 hour of fermentation, 12 g sunflower oil (Naturel brand) is added into the mixture. The Philips air fryer is preheated at 180° C. for 10 minutes. After preheating, the rested mixture is put into a silicone mold and placed inside the air-fryer. It is then heated with circulated high velocity hot air passing through it at 160° C. for 18 minutes. The vadai are flipped halfway through the air-heating process to ensure both sides are cooked. After this, the vadai pieces are immediately removed and placed in open air to cool.

Example 32

100 g of flour (Prima Flour) is weighed into a mixing bowl, 2 g of gluten was added to the flour mixture. The flour is mixed for 30 seconds with a Philips HR1456 hand-held mixer at setting 1. 0.5 g of crude palm oil (obtained directly from a palm oil mill) is placed in an 80° C. water bath for approximately 1 minute to liquefy it slightly. After this, the crude palm oil is slowly added into the mixing bowl, while mixing for 1 minute. A 1% kansui solution is made from a kansui mix, comprising of 90% iodised salt, sodium pyrophosphate anhydrous, sodium carbonate and potassium carbonate, typically having a pH of between 10 and 11. 0.3 g ground lecithin granules (Origins Healthfood) is added to 37.5 g of 3% kansui solution and stirred to dissolve it completely. The resultant solution is slowly added into the mixing bowl, while mixing for 2.5 minutes. The dough is kneaded slightly together and then left to rest for 10 minutes. After 10 minutes of resting, the dough is sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The noodles are then placed in a Philips air heater. It is then air heated at 150° C. for 9 minutes. After this, the noodles are immediately removed and placed in open air to cool.

Example 33

100 g of flour (Prima Flour) is weighed into a mixing bowl. The flour is mixed for 30 seconds with a Philips HR1456 hand-held mixer at setting 1. 1 g of crude palm oil (obtained directly from a palm oil mill) is placed in an 80° C. water bath for approximately 1 minute to liquefy it slightly. After this, the crude palm oil is slowly added into the mixing bowl, while mixing for 1 minute. Separately, 1 g of salt (Tata Brand) is dissolved into 33 g of alkaline water (1 g Redman brand alkaline water diluted with 500 g water). The water and salt mixture is slowly added into the mixing bowl, while mixing for 2.5 minutes. The dough is kneaded slightly together and then left to rest for 10 minutes. After 10 minutes of resting, the dough is sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The noodles are then placed in a Philips air heater. It is then air heated at 150° C. for 9 minutes. After this, the noodles are immediately removed and placed in open air to cool.

Example 34

100 g of flour (Prima Flour) was weighed into a mixing bowl. The flour is mixed for 30 seconds with a Philips HR1456 hand-held mixer at setting 1. After this, 0.25 g of super refined palmolein (Harmuni brand) was slowly added into the mixing bowl, while mixing for 1 minute. Separately, 1 g of salt (Tata Brand) was dissolved into 38 g of alkaline water (1 g Redman brand alkaline water diluted with 500 g water, to reach a pH between 9 and 10). The water and salt mixture is slowly added into the mixing bowl, while mixing for 2.5 minutes. The dough was kneaded slightly together and then left to rest for 10 minutes. After 10 minutes of resting, the dough is sheeted with a Marcato Brand (model Ampia 180) noodle maker. The dough was sheeted at dial 1 for 3 times and dial 3 for 2 times, and lastly at dial 6 for 1 time to achieve 1 mm thickness. The dough sheet was passed through the noodle cutter to produce the noodles (1 mm by 1.3 mm). The noodles were then placed in a Philips air heater. It is then air heated at 150° C. for 9 minutes. After this, the noodles were immediately removed and placed in open air to cool.

Example 35

100 g of flour (Prima Flour) is weighed into a mixing bowl. The flour is mixed for 30 seconds with a Philips HR1456 hand-held mixer at setting 1. After this, 2.5 g of fresh super refined palmolein (Harmuni brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 0.3 g ground lecithin granules (Origins Healthfood) is added to 35.5 g of 1% kansui solution and stirred to dissolve it completely. The resultant solution is slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air heater is preheated at 140° C. for 4 minutes. The noodles are then placed in a Philips air heater. It is then air heated at 140° C. for 6 minutes. The temperature is then increased to 160° C. for 2 minutes. After this, the noodles are immediately removed and placed in open air to cool.

Using the above method a range of flours can be used, such as durum flour which has a high gluten protein content, or flours which contain little or no protein such as rice flour that therefore need to be supplemented by the addition of gluten. Optionally flours can be pretreated with enzymes such as transglutaminase, peroxidase or lipoxygenase to improve their properties. Or the flour can be supplemented with a hydrocolloid or mixture of hydrocolloids to aid in water-binding, creating a better noodle structural matrix prior to the air heating, improving mouthfeel, also improving rehydration characteristics of noodles during cooking and improve the overall texture and mouthfeel of the product. In particular the use of a high protein flour, and or the addition of gluten to the dough not just improved the protein content of flours but also helped to create a fried flavour, so that in the presence of gluten or higher concentrations of gluten the concentration of oil that needs to be added into the dough to produce a noodle with a fried taste can be reduced.

Example 36

100 g of flour (Prima Flour) is weighed into a mixing bowl, 2 g of gluten was added to the flour mixture. The flour is mixed for 30 seconds with a Philips HR1456 hand-held mixer at setting 1. 0.5 g of crude palm oil containing combinations of antioxidants (obtained directly from a palm oil mill) is placed in an 80° C. water bath for approximately 1 minute to liquefy it slightly. After this, the crude palm oil is slowly added into the mixing bowl, while mixing for 1 minute. A 1% kansui solution is made from a kansui mix, comprising of 90% iodised salt, sodium pyrophosphate anhydrous, sodium carbonate and potassium carbonate, typically having a pH of between 10 and 11. 0.3 g ground lecithin granules (Origins Healthfood) is added to 37.5 g of 3% kansui solution and stirred to dissolve it completely. The resultant solution is slowly added into the mixing bowl, while mixing for 2.5 minutes. The dough is kneaded slightly together and then left to rest for 10 minutes. After 10 minutes of resting, the dough is sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The noodles are then placed in a Philips air heater. It is then air heated at 150° C. for 9 minutes. After this, the noodles are immediately removed and placed in open air to cool.

Thus when the method as described in EXAMPLE 36 was carried out using a dough that in addition also contained 2 g of gluten, but only 0.5 g of oil, a fried tasting noodle with good organoleptic quality and physical properties was produced.

Example 37

100 g of durum flour (Bob's Red Mill No. 1 Durum Wheat Semolina Flour) is weighed into a mixing bowl. The flour is mixed for 30 seconds with a Philips HR1456 hand-held mixer at setting 1. After this, 6 g of super refined palmolein (Harmuni brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate, typically having a pH of between 10 and 11. 32 g of 1% kansui solution is slowly added into the mixing bowl, while mixing for 4.5 minutes. The dough is kneaded slightly together and then left to rest for 10 minutes. After 10 minutes of resting, the dough is sheeted with a Marcato Brand (model Ampia 180) noodle maker. The dough is sheeted at dial 1 for 5 times and dial 3 for 2 times, and lastly at dial 6 for 1 time to achieve 1 mm thickness. The dough sheet is passed through the noodle cutter to produce the noodles (1 mm by 1.3 mm). The noodles are then placed in a Philips air heater. It is then air heated at 150° C. for 9 minutes. After this, the noodles are immediately removed and placed in open air to cool.

Example 38

On a pilot scale, to prepare the dough, 2000 g of flour (Prima Flour) is added into an industrial dough mixer. 6 g of Xanthan Gum and 6 g of Kappa-carrageenan gum is added into the flour and it is dry mixed in an industrial dough mixer for 1 minute. After this, 120 g of super refined palmolein (Harmuni brand) is slowly added into the mixing bowl, while mixing for 1 minute at low speed 1. Alkaline water (3 g Redman brand alkaline water diluted with 800 g water) is then added while mixing and then mixed for 1 minute at low speed 1, followed by 5 minutes at high speed 2. The dough is then sheeted by running through setting 10 for 3 times. The dough sheet is cling wrapped and rested for 15 minutes. The dough is then sheeted to a final thickness of about 1.8 mm. The dough is then cut into noodles. The noodles are then placed in Philips air heater and air heated in batches at 150° C. for 9 minutes. After this, the noodles are immediately removed and placed in open air to cool.

Example 39

In a second example of the use of hydrocolloids, 100 g of flour (Prima Flour) is weighed into a mixing bowl. 0.2 g of Pectin gum, 0.2 g of guar gum, and 0.2 g of Trehalose is weighed and added into the mixing bowl containing flour (Prima Flour). The flour containing the hydrocolloids is mixed for 30 seconds with a Philips HR1456 hand-held mixer at setting 1. After this, 6 g of super refined palmolein (Harmuni brand) is slowly added into the mixing bowl, while mixing for 1 minute. A 1% kansui solution is made from kansui mix, comprising of 90% iodised salt, sodium pyrophosphate anhydrous, sodium carbonate and potassium carbonate, typically having a pH range of 10 to 11. 1.2 g of salt (Tata Brand) is dissolved into 32 g of 1% kansui solution (1 g kansui mix diluted with 100 g drinking water). The water and salt mixture is slowly added into the mixing bowl, while mixing for 2.5 minutes. The dough is kneaded slightly together and then left to rest for 10 minutes. After 10 minutes of resting, the dough is sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The noodles are then placed in a Philips air heater. It is then air heated at 150° C. for 9 minutes. After this, the noodles are immediately removed and placed in open air to cool.

Using the above method a range of oils from various sources, can be used ranging in price from olive oils to palmolein to refined, bleached, deodorised palm oil (RBDPO) to crude palm oil (CPO) containing combinations of antioxidants. For instance if fried noodles with an exceptionally low oil are required then oils can be included in the dough to produce noodles with a fried taste either by using an oil that contains precursors of fried flavour that generate a fried flavour when heated during the cooking of the noodles, or containing a relatively concentrated fried flavour.

Crude palm oil has been found to impart a fried flavour to noodles as a result of being heated inside the noodles during their cooking, and provide a more intense and natural sweetcorn-yellow colour to the noodles. The interaction of the antioxidants in the crude palm oil with the triglycerides result in the development of fried organoleptic properties. For example the use of crude palm oil results in the formation of noodles with a fried flavour even when used at a concentration of 1.0% and without any added emulsifier because the CPO contains natural phospholipid emulsifiers and antioxidants as described below in EXAMPLE 40. Pre-fried oils that have been used to deep fry noodles or some other material for a long period in the conventional manner can be used as a source of fried flavour, provided that they have not become rancid or contain other off-aromas such as produced when oils have undergone oxidative degradation when heated for long periods or have been heated to above their smoke temperatures.

In addition combinations of different oils, including containing a combination of an oil that contains a fried flavour and another oil that is a source of fried can also be used using the same method as above. For instance a combination of equal amounts of pre-fried oil and CPO also at a combined concentration of just 1% also produced a noodle with a fried taste but of a lower intensity than when just the CPO was used alone.

Another way to generate a fried tasting ingredient to increase the flavour of noodles containing low concentrations of oil is to add a fried flavour, such as by deep-frying dough, and then hydrolysing it with enzymes such as an alpha or beta amylase and/or protease to make a liquid fried flavour that can be added to the low oil inside dough before air heating.

Example 40

100 g of flour (Prima Flour) is weighed into a mixing bowl. The flour is mixed for 30 seconds with a Philips HR1456 hand-held mixer at setting 1. 1 g of crude palm oil containing combinations of antioxidants (obtained directly from a palm oil mill) is placed in an 80° C. water bath for approximately 1 minute to liquefy it slightly. After this, the crude palm oil is slowly added into the mixing bowl, while mixing for 1 minute. Separately, 1 g of salt (Tata Brand) is dissolved into 33 g of alkaline water (1 g Redman brand alkaline water diluted with 500 g water). The water and salt mixture is slowly added into the mixing bowl, while mixing for 2.5 minutes. The dough is kneaded slightly together and then left to rest for 10 minutes. After 10 minutes of resting, the dough is sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The noodles are then placed in a Philips air heater. It is then air heated at 150° C. for 9 minutes. After this, the noodles are immediately removed and placed in open air to cool.

Example 41

The pre-fried oil as described above was made by placing 850 g of super refined palmolein (Harmuni brand) in a deep fryer. 210 g of commercially purchased Hong Kong Style Noodles or Cantonese Style Noodles (Fortune brand) was placed in the fryer and fried for 1.5 minutes at 170° C. After that, the noodles are removed. The process is repeated for 8 times using fresh noodles on each occasion. Provided the resulting oil was within the WINA recommendations it can then be used in combination with an equal concentration of CPO containing combinations of antioxidants at an overall concentration of 1% as described in EXAMPLE 40.

Another way to generate a fried tasting ingredient to increase the flavour of noodles containing low concentrations of oil is to add a fried flavour, such as by deep-frying dough, and then hydrolysing it with enzymes such as alpha amylase and protease to make a liquid fried flavour that can be added to the low oil inside dough before air heating.

As stated above the significantly lower concentrations of oil present in noodles produced by the novel process not just reduce their costs of manufacture but also produce healthier food products, with the healthiness of the noodles being roughly proportional to the extent to which operating costs have been reduced and vice versa. However the novel process also makes possible a range of other health benefits including as follows:

The use of fresh oil, as compared to the current processes in which the same oil is used to fry many successive batches of noodles and so has generated a range of by-products of uncertain health status.

The use of less refined oils such as crude palm oil that contain healthy ingredients such as the antioxidants alpha and beta carotenes, lycopene, lutein, tocopherols and tocotrienols, together with other healthy ingredients such as linoleic acid and smaller amounts of linolenic and arachidic acids, molecules such as coenzyme Q10; and with the carotenes also giving the noodles an attractive and natural yellow colour (see EXAMPLES 3, 4, 29, 32, 33, 36 and 40 above).

The use of healthier oils but more expensive oils such as olive oil, because of the much lower quantities of oil required by the novel process possible using this invention as compared with the current processes can actually result in a lower cost-in-use.

The addition of healthy ingredients such as oat bran fibre can also be introduced into the noodles produced by this process.

In addition simply by adding one or more additional heating stages the novel process can produce re-fried noodles in which the amounts of resistant starch have been increased so reducing the glycemic index of the noodles so produced.

Example 42

100 g of flour (Prima Flour) is weighed into a mixing bowl. The flour is mixed for 30 seconds with a Philips HR1456 hand-held mixer at setting 1. After this, 0.5 g of super refined palmolein (Harmuni brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate, typically having a pH of between 10 and 11. 0.3 g ground lecithin granules (Origins Healthfood) is added to 37.5 g of 3% kansui solution and stirred to dissolve it completely. The resultant solution is slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The Philips air heater is preheated at 140° C. for 4 minutes. The noodles are then as loosely spread out as possible in a Philips air heater. It is then air heated at 140° C. for 6 minutes. The temperature is then increased to 160° C. for 2 minutes. After this, the noodles are immediately removed and placed in open air to cool. They are then cooked for 1 minute in boiling water, and then cooled down in a low-temperature industrial refrigerator overnight. The next day they are heated either by frying in a pan, or in boiling water, and then eaten.

Example 43

100 g of flour (Prima Flour) is weighed into a mixing bowl. The flour is mixed for 30 seconds with a Philips HR1456 hand-held mixer at setting 1. 0.5 g of chilli oil containing antioxidants is mixed with 5.5 g of super refined palmolein (Harmuni brand) and the resultant mixture of oil containing antioxidants is slowly added into the mixing bowl, while mixing for 1 minute. A 1% kansui solution is made from a kansui mix, comprising of 90% iodised salt, sodium pyrophosphate anhydrous, sodium carbonate and potassium carbonate, typically having a pH of between 10 and 11. 32 g of 1% kansui solution is slowly added into the mixing bowl, while mixing for 4.5 minutes. The dough is kneaded slightly together and then left to rest for 10 minutes. After 10 minutes of resting, the dough is sheeted with a Marcato Brand (model Ampia 180) noodle maker. The dough is sheeted at dial 1 for 5 times and dial 3 for 2 times, and lastly at dial 6 for 1 time to achieve 1 mm thickness. The dough sheet is passed through the noodle cutter to produce the noodles (1 mm by 1.3 mm). The noodles are then placed in a Philips air heater. It is then air heated at 150° C. for 9 minutes. After this, the noodles are immediately removed and placed in open air to cool.

Example 44

Garlic mince was prepared as follows: 3 cloves of garlic was ground and minced in a stone mortar, until very fine. 100 g of flour (Prima Flour) was weighed into a mixing bowl. The flour is mixed for 30 seconds with a Philips HR1456 hand-held mixer at setting. 2 g of minced garlic was added to 1. 6 g of super refined palmolein (Harmuni brand) and the resultant mixture of oil containing antioxidants is slowly added into the mixing bowl, while mixing for 1 minute. A 1% kansui solution is made from a kansui mix, comprising of 90% iodised salt, sodium pyrophosphate anhydrous, sodium carbonate and potassium carbonate, typically having a pH of between 10 and 11. The Kansui solution is slowly added into the mixing bowl, while mixing for 4.5 minutes. The dough is kneaded slightly together and then left to rest for 10 minutes. After 10 minutes of resting, the dough is sheeted with a Marcato Brand (model Ampia 180) noodle maker. The dough is sheeted at dial 1 for 5 times and dial 3 for 2 times, and lastly at dial 6 for 1 time to achieve 1 mm thickness. The dough sheet is passed through the noodle cutter to produce the noodles (1 mm by 1.3 mm). The noodles are then placed in a Philips air heater. It is then air heated at 150° C. for 9 minutes. After this, the noodles are immediately removed and placed in open air to cool.

The novel process can also be used to make noodles equivalent to current air-dried noodles either without adding any oil, depending on the endogenous oil content of the noodles, or using dough containing only very low concentrations of oil added into the noodles dough either sufficient to increase the oil concentration to levels present in flours containing the higher concentrations of endogenous oil, or to improve the colour of the noodles by including a low concentration of CPO containing antioxidants as described above, but with the total amount of oil present being insufficient to increase the oil concentration high enough to generate a fried flavour. The addition of oil improves the heat transfer properties of the noodle dough, so accelerating its heating and reducing the time needed to cook it. Using this approach air dried-style noodles can be made in a much shorter time than in the current process, which requires at least a minimum of 45 minutes drying, thus reducing heating costs and improving the productivity of manufacturing. In addition, this faster process for making air-dried noodles can also incorporate the methods described above for making healthier noodles such as the incorporation of healthy ingredients including the reduction of the GI of the noodles, and including flavours and/or as above. Lastly, air-dried noodles currently require a completely different industrial line to that required to make deep fried noodles, but the novel processing line will be able to make both air-dried type noodles and noodles with a fried flavour.

Example 45

100 g of flour (Prima Flour) is weighed into a mixing bowl. 0.3 g of guar gum is added into the flour. The flour is mixed for 30 seconds with a Philips HR1456 hand-held mixer at setting 1. After this, 6 g refined palmolein oil (Turkey Brand) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The steamer is preheated for 5 minutes at 100° C. The cut noodles are steamed at 100° C. for 3 minutes. After that, the noodles are dried at room temperature for 1 minute. The noodles are then air dried in an oven at 125° C. for 40 minutes. The noodle cake is flipped every 5 minutes to ensure even cooking. After this, the noodles are immediately removed and placed in open air to cool.

Example 46

100 g of flour (Prima Flour) is weighed into a mixing bowl. 0.3 g of guar gum is added into the flour. The flour is mixed for 30 seconds with a Philips HR1456 hand-held mixer at setting 1. After this, 2 g raw, minced Asian garlic (cloves are crushed and added to the mixture immediately) is slowly added into the mixing bowl, while mixing for 1 minute. A 1% kansui solution is made from a kansui mix, comprising of 90% iodised salt, sodium pyrophosphate anhydrous, sodium carbonate and potassium carbonate. 1 g of salt (Pagoda Brand) is added into 35 g of 1% kansui solution and stirred to dissolve it completely. The resultant solution is then slowly added into the mixing bowl, while mixing for 4.5 minutes. The dough is kneaded slightly together and sheeted with a Marcato Brand (model Ampia 180) noodle maker. The dough is sheeted at dial 1 for 3 times and dial 3 for 2 times, and lastly at dial 6 for 1 time to achieve 1 mm thickness. The dough sheet is passed through the noodle cutter to produce the noodles (1 mm by 1.3 mm). The steamer is preheated for 5 minutes at 100° C. The cut noodles are steamed at 100° C. for 3 minutes. After that, the noodles are dried at room temperature for 1 minute. The noodles are then air dried in an oven at 125° C. for 40 minutes. The noodle cake is flipped every 5 minutes to ensure even cooking. After this, the noodles are immediately removed and placed in open air to cool.

Example 47

100 g of flour (Prima Flour) was weighed into a mixing bowl. The flour is mixed for 30 seconds with a Philips HR1456 hand-held mixer at setting 1. After this, 0.25 g of super refined palmolein (Harmuni brand) was slowly added into the mixing bowl, while mixing for 1 minute. Separately, 1 g of salt (Tata Brand) was dissolved into 38 g of alkaline water (1 g Redman brand alkaline water diluted with 500 g water, to reach a pH between 9 and 10). The water and salt mixture is slowly added into the mixing bowl, while mixing for 2.5 minutes. The dough was kneaded slightly together and then left to rest for 10 minutes. After 10 minutes of resting, the dough is sheeted with a Marcato Brand (model Ampia 180) noodle maker. The dough was sheeted at dial 1 for 3 times and dial 3 for 2 times, and lastly at dial 6 for 1 time to achieve 1 mm thickness. The dough sheet was passed through the noodle cutter to produce the noodles (1 mm by 1.3 mm). The noodles were then placed in a Philips air heater. It is then air heated at 150° C. for 9 minutes. After this, the noodles were immediately removed and placed in open air to cool.

The novel process can also be used to cook other food such as doughnuts EXAMPLE 48, Instant Xiao Long Bao EXAMPLE 49, Instant Gyoza EXAMPLE 50, and pasta EXAMPLE 51, as well as others such as fish-fingers and other battered products, again using only small amounts of oil incorporated into the foods themselves.

Example 48

A packet of doughnut mix (PrimaMix) was emptied into a mixer, 180-200 ml water was added, and mixed at a low speed for 1 minute. The dough in the mixer was covered with a moist cloth, and stood for about 25 minutes at room temperature. Oil was added to a concentration of 2% of the dough, which was then kneaded into the shape of a doughnuts with a weight of 48 g each, and then air heated for 8 minutes at 180° C. The weights of the doughnuts prepared were in the range 40.5 g to 43 g.

Example 49

150 g flour (Prima Flour) was placed in a mixing bowl. 10 g of refined palmolein (Harmuni brand) is added into the flour and mixed by hand into a dough. 64 g of water is added slowly while kneading the dough, until it is a soft and pliable dough. The dough is then rested for 2 hours. The dough is then sheeted with a Marcato Brand (model Ampia 180) noodle maker. The dough is sheeted at dial 1 for 1 time and dial 6 for 1 time. A circular shaped dough is cut out from the dough sheet and a teaspoonful of raw marinated pork is placed onto the dough. The dough is wrapped accordingly, enclosing the meat to form xiao long bao. The xiao long bao are placed in a Philips air heater. It is then air heated at 100° C. for 5 minutes, 80° C. for 20 minutes, and then 100° C. for 10 minutes. After this, the xiao long bao are immediately removed and placed in open air to cool. In the home kitchen, consumers may choose to steam the xiao long bao for 3 minutes.

Example 50

150 g flour (Prima Flour) was placed in a mixing bowl. 10 g of refined palmolein (Harmuni brand) is added into the flour and mixed by hand into a dough. 64 g of water is added slowly while kneading the dough, until it is a soft and pliable dough. The dough is then rested for 2 hours. The dough is the sheeted with a Marcato Brand (model Ampia 180) noodle maker. The dough is sheeted at dial 1 for 1 time and dial 6 for 1 time. A circular shaped dough is cut out from the dough sheet and a teaspoonful of raw marinated pork is placed onto the dough. The dough is wrapped accordingly, enclosing the meat to form gyoza. The gyoza are then placed in a Philips air heater and air heated at 100° C. for 15 minutes. In the home kitchen, consumers may choose to fry the gyoza with oil, or cook the gyoza in boiling water for 3 minutes, to be consumed as a dumpling.

Example 51

200 g of durum flour (Bob's Red Mill No. 1 Durum Wheat Semolina Flour) was combined with 0.5 teaspoon salt (Tata Brand) into a mixing bowl. Then, 2 eggs, 14 g of water (drinking water), and 10 g of olive oil containing antioxidants (FairPrice 100% Pure Olive Oil) is added. The combination is mixed with a tablespoon until the ingredients become a dough mass. Following this, the dough mass is mixed and kneaded by hand for 10 minutes. The dough is wrapped in a plastic Ziploc bag, and then left to rest for 20 minutes. After 20 minutes of resting, the dough is sheeted with a Marcato Brand (model Ampia 180) noodle maker. The dough is sheeted at dial 3 for 4 times, followed by sheeting at dial 6 for 1 time. After which, the dough sheet is either 1) passed through the wide cutter to produce linguine, 2) passed through the narrow cutter to produce spaghetti 3) cut into sheets to form lasagne sheets 4) folded into tortellinis and 5) rolled into pennes. The pasta is then placed in a Philips air heater. Spaghetti are air heated at 150° C. for 9 minutes. The linguine are air heated at 150° C. for 10 minutes. The lasagne sheets, penne and tortellini are air heated at 150° C. for 13 minutes. After this, they are immediately removed and placed in open air to cool. Pasta such as spaghetti and linguine were cooked in boiling water for 8 minutes. The penne and tortellini were cooked in boiling water for 10 minutes. The pastas were eaten with pasta sauce. Lasagna was cooked as follows. Ground beef, mushrooms, onions, and pasta sauce are cooked in a large skillet. In a separate bowl, mozzarella cheese and parmesan cheese were combined. A thin layer of meat sauce was spread in the bottom of a casserole deep dish, and then layered with uncooked lasagne sheets, cheese mixture, and followed by meat sauce again. The process is repeated until all ingredients are used, with approximately 0.5 cup of cheese mixture left. The deep dish is covered with aluminum foil and baked at 175° C. for 30 minutes. After 30 minutes, uncover and top with the remainder of cheese mixture. The lasagne is baked for another 15 minutes.

The novel process also allows for added convenience to the consumer in terms of pasta products. Pasta products typically require the consumer to add some vegetable oil, such as olive oil, into the boiling water, during the cooking process. EXAMPLE 51 shows how this oil is pre-incorporated during the pasta making process thus saving the consumer the necessity of adding oil during the cooking process, and instead, simply cooking with boiling water.

Example 52

55 g of Semolina Flour (Prima Brand) and 55 g of plain wheat flour (Prima Brand) was combined into a mixing bowl. The flours are mixed with a fork for 1 minute to ensure they are homogenously mixed. A well is created in the flour and 1 egg yolk (Pasar Brand) is added into the flour. After that, 1.855 g of olive oil containing antioxidants (FairPrice 100% Pure Olive Oil) is drizzled over the mixture. The flour-oil-yolk mixture is mixed by hand for 0.5 minutes. 0.3 g ground lecithin granules (Origins Healthfood) is added to 34 g of water and stirred until the lecithin have dissolved completely. Then, 0.8 g of salt (Tata Brand) is added into the water mixture. The water mixture is slowly added to the flour mixture while mixing by hand for 5 minutes, until it become a smooth dough mass. The dough is placed in a plastic container, and then covered and left to rest for 20 minutes. After 20 minutes of resting, the dough is sheeted with a Marcato Brand (model Ampia 180) noodle maker. The dough is sheeted at dial 1 for 3 times, followed by sheeting at dial 3 for 2 times, followed by sheeting at dial 7 for 1 time. After which, the dough sheet is passed through the wide cutter to produce linguine. The Philips air heater is preheated at 110° C. for 10 minutes. The linguine is then placed in a Philips air heater and air heated at 110° C. for 10 minutes. After 10 minutes, the linguine are flipped and air heated at 110° C. for 7 minutes. After this, they are immediately removed and placed in open air to cool. The linguine were cooked in boiling water for 4 minutes and eaten with pasta sauce.

Example 53

As described herein, the antioxidants that may be added to boost the fried organoleptic characteristics are summarized alternatively by their average specific activity which is a formula derived from the ratio of the fatty taste in neat (as ranked by panelists) to the mg of the ingredient incorporated into and dispersed within the dough with respect to 100 g of flour.

TABLE 2

Non-limiting examples of specific activities of ingredients added to boost the fried organoleptic characteristics.

| Ingredient | Average Specific Activity (Fatty taste ranking/mg of ingredient used per 100 g flour) |
|---|---|
| lycopene with oil | 7.03 |
| beta-carotene no oil | 6.06 |
| beta-carotene with oil | 5.92 |
| lycopene no oil | 4.80 |
| alpha tocopherol no oil | 0.67 |
| 5% beta-carotene dissolved in a spirulina extract with oil | 0.49 |
| alpha tocopherol with oil | 0.48 |
| retinol with oil | 0.26 |
| retinol no oil | 0.12 |
| lutein no oil | 0.0623 |
| sesame seed oil | 0.0063 |
| raw garlic no oil | 0.0056 |
| raw onion no oil | 0.0045 |
| raw garlic with oil | 0.0042 |
| quercetin no oil | 0.0033 |
| Flaxseed oil | 0.0030 |
| roasted flaxseed oil | 0.0022 |
| Fried onion oil | 0.0018 |
| Fried asian garlic oil | 0.0015 |
| toasted sunflower seed oil | 0.0014 |
| raw onion with oil (infused) | 0.0011 |
| palmolein | 0.0010 |

Forms of fried and air dried noodles and some other foods as produced as above that are both healthier and lower cost due to their containing only low concentrations of oil, and with a range of flavours, especially fried flavours can be made by the novel processes described above in which low concentrations of a variety of oils are mixed into doughs made using different flours and heated in a high velocity stream of hot air without any previous steaming step in the process.

Forms of low fat containing fried noodles made by the process described above

Forms of air-dried noodles as made by the faster process described above

Healthier forms of fried and air-dried noodles as made by the processes described above.

Healthier forms of fried and air-dried noodles as made using two or more cycles of heating using the processes described above.

Forms of low fat containing fried noodles as described above made using one or some combination of oils that have been pre-fried oils, using less refined forms of oils, emulsifiers, and that contain additional protein such as gluten.

Forms of fried and air-dried noodles with a more intense yellow colour made by the processes described above.

Flavoured fried and air-dried noodles produced by including flavours in the dough and made by the faster process described above Forms of other foods as made by the processes described above such as doughnuts, dumplings, pasta, or other foods known in the art.

Unrefined palm oils as an ingredient to impart a fried flavour and/or a natural yellow colour to foods that are heat processed, and especially foods that are subjected to temperatures sufficient to fry them such as processed cheese, low fat spreads and chips and french fries.

The use of oils that have experienced prolonged or repeated frying as an ingredient to impart a fried flavour to foods that are heat processed, and especially foods that are subjected to temperatures sufficient to fry them.

Noodle dough containing dispersed oil, or oil plus healthy ingredients, and/or flavours and/or oil and added protein especially gluten.

In this process absolutely all the oil used is incorporated into the dough or food used to make the noodles. So our process is completely 'All-Oil-Inside', with all of the oil mixed into the noodle dough. This provides the advantage that the steaming step is eliminated from the traditional noodle manufacturing processes.

Using the all-oil-inside approach we make fried noodles containing a lower concentration of oil than traditional noodle making processes.

Using the all-oil-inside approach the resulting fried noodles contain concentrations of oil between 0.06% and 15%.

The method does not require addition of resistant starch, as this can be generated by using a third or more cooling and then a further heating stage and thereby generating resistant starch endogenously in the original noodles and thus lower glycaemic index, and therefore healthier noodles.

In addition to the many ways described to produce healthier noodles, a number of additional ways of producing healthier noodles, especially by using different oils, and by adding healthy ingredients would be understood by a person skilled in the art.

It should be further appreciated by the person skilled in the art that variations and combinations of features described above, not being alternatives or substitutes, may be combined to form yet further embodiments falling within the intended scope of the invention.

Throughout this document, unless otherwise indicated to the contrary, the terms "comprising", "consisting of", and the like, are to be construed as non-exhaustive, or in other words, as meaning "including, but not limited to".

Furthermore, although individual embodiments have been discussed it is to be understood that the invention covers combinations of the embodiments that have been discussed as well.

The invention described herein may include one or more range of values (e.g. weight percent, temperature, velocity). A range of values will be understood to include all values within the range, including the values defining the range, and values adjacent to the range which lead to the same or substantially the same outcome as the values immediately adjacent to that value which defines the boundary to the range.

What is claimed is:

1. A process for producing a food product with enhanced fried oil flavour and health benefit, the process comprising:
   (a) preparing a dough comprising an added antioxidant, flour, oil in the range of 0.06% to 15% by weight with respect to the weight of the flour; and a water-based liquid;
   (b) shaping the dough;
   (c) placing the shaped dough in a chamber; and
   (d) cooking the dough, wherein the cooking of the dough comprises: gelatinising the flour in the dough in two stages in a humid environment at a temperature of 55° C. to 165° C.; and
   at least one stage of cooking the dough by circulating a stream of air at a temperature of 100° C. to 220° C. and at a speed of 1 to 10 metres per second; and
   wherein the oil is incorporated into the dough without any external application of oil to the shaped dough prior to gelatinising the flour and cooking the dough.

2. The process according to claim 1, wherein the food product comprises noodles.

3. The process according to claim 1, wherein the added antioxidant is selected from the group consisting of lycopene, lutein, tocotrienols, retinol, coenzyme Q10, alliin, allicin, diallyl disulfide, quercetin, protocatechuic acid, lignans, molecules obtained from *Allium* species and any combination thereof.

4. The process according to claim 3, wherein the added antioxidant is comprised in macerated garlic or macerated onion.

5. The process according to claim 1, wherein the oil includes an added exogenous oil.

6. The process according to claim 5, wherein the added exogenous oil is a vegetable oil, a triglyceride based oil or a liquid oil.

7. The process according to claim 6, wherein the added exogenous oil is selected from the group consisting of sunflower oil, sesame seed oil, flaxseed oil, olive oil, oils extracted from roasted oil seeds such as sunflower, sesame and flaxseed, fractions of palm oil, palmolein, crude palm oil, coconut oil, refined bleached deodorized palm oil, onion-infused oil, garlic-infused oil, fried garlic oil, fried onion oil, pre-fried oil and any combination thereof.

8. The process according to claim 1, wherein the two stages of gelatinising the flour in the dough comprises:
   a first gelatinising stage comprises circulating humid air at a speed of 1 to 10 metres per second; and
   a second gelatinising stage comprises static humid air.

9. The process according to claim 1, wherein the stage of cooking occurs in two stages carried out in an environment where the humidity is lower than the humid environment of the gelatinization stages; a first cooking stage comprises dehydrating the noodles and a second cooking stage comprises a development of colour, good eating quality and fried oil flavour, wherein the temperature in the second cooking stage is higher than the temperature in the first cooking stage.

10. The process according to claim 8, wherein the first gelatinising stage is from 55 C to 160 C for 0.5 minutes to 2 minutes.

11. The process according to claim 8, wherein the second gelatinising stage is from 90 C to 165 C for 0.5 minutes to 1 minute.

12. The process according to claim 9, wherein the first cooking stage is from 100 C to 160 C for 1 minute to 6 minutes; and the second cooking stage is from 110 C to 190 C for 1 to 4 minutes.

13. The process according to claim 3, wherein the added antioxidant is an antioxidant blend comprising two or more antioxidants selected from the group consisting of lycopene, lutein, tocotrienols, retinol, coenzyme Q10, alliin, allicin, diallyl disulfide, quercetin, protocatechuic acid, lignans and molecules obtained from *Allium* species, wherein at least one of the two or more antioxidants comprises molecules obtained from *Allium* species.

14. The process according to claim 1, wherein the added antioxidant is added into the flour for making the dough.

15. The process according to claim 1, wherein the added antioxidant is added into the oil for making the dough.

* * * * *